United States Patent
Smith

(10) Patent No.: US 11,906,347 B2
(45) Date of Patent: Feb. 20, 2024

(54) ADJUSTABLE WIDTH LIFT AND WEIGH APPARATUS FOR LIFTING MACHINES

(71) Applicant: Buckeye Scale LLC, Walton Hills, OH (US)

(72) Inventor: Steven Edward Smith, Ravenna, OH (US)

(*) Notice: Subject to any disclaimer, the term of this patent is extended or adjusted under 35 U.S.C. 154(b) by 230 days.

(21) Appl. No.: 17/407,965

(22) Filed: Aug. 20, 2021

(65) Prior Publication Data

US 2023/0059508 A1    Feb. 23, 2023

(51) Int. Cl.
G01G 19/08    (2006.01)
G01G 3/14    (2006.01)
B66F 9/14    (2006.01)

(52) U.S. Cl.
CPC .......... *G01G 19/083* (2013.01); *B66F 9/14* (2013.01); *G01G 3/1402* (2013.01)

(58) Field of Classification Search
CPC .. G01G 3/1402; G01G 3/1412; G01G 19/083; B66F 9/14
See application file for complete search history.

(56) References Cited

U.S. PATENT DOCUMENTS

| | | | | |
|---|---|---|---|---|
| 3,231,035 A | * | 1/1966 | Wise | B66F 17/003 177/139 |
| 3,376,537 A | * | 4/1968 | Pugnaire | G01L 1/2218 73/862.632 |
| 3,754,673 A | | 8/1973 | Barda et al. | |
| 3,910,363 A | | 10/1975 | Airesman | |

(Continued)

FOREIGN PATENT DOCUMENTS

| | | |
|---|---|---|
| CN | 106276715 A | 1/2017 |
| CN | 109704236 B | 5/2019 |

(Continued)

OTHER PUBLICATIONS

"VFS120 Forklift Scale" Product Brochure, Forklift Scales, Mettler-Toledo AG, https://www.mt.com/in/en/home/library/product-brochures/transport-logistics/VFS120-brochure-download.html (8 pages total).

(Continued)

*Primary Examiner* — Randy W Gibson
(74) *Attorney, Agent, or Firm* — John Maldjian; David D'Amato; Stevens & Lee PC

(57) ABSTRACT

A configurable-width industrial weighing scale configured to hang directly from one of multiple engine-powered lifting machines and/or to couple to a quick-attach plate or other attachment means of an engine-powered lifting machine and configured to directly support a lifting element and/or couple to a quick-attach plate or other attachment means of a lifting element. A weighing element includes front and rear plates in parallel with one another and a weighing assembly therebetween. The weighing assembly may include a strain gauge-based load cell, a shock absorber, a mechanical preload adjustment to control a vertical difference between the front and rear plates, a mechanical linearity control to adjust an angle of the weighing assembly, a carriage alignment bolt to compensate for an uneven surface of a lifting carriage of the engine-powered lifting machine, and/or a mechanical adjustment to compensate for a distance between the front plate and a load.

21 Claims, 33 Drawing Sheets

(56) References Cited

U.S. PATENT DOCUMENTS

| | | | |
|---|---|---|---|
| 4,177,001 | A | 12/1979 | Blackwood |
| 4,323,132 | A | 4/1982 | Bradley |
| 4,421,186 | A * | 12/1983 | Bradley ............... G01G 3/1404 177/139 |
| 6,002,090 | A * | 12/1999 | Johnson ............... G01L 1/2262 73/1.13 |
| 7,026,557 | B2 * | 4/2006 | Rice ..................... G01G 19/083 177/136 |
| 8,087,868 | B2 | 1/2012 | Turnbull et al. |
| 8,186,931 | B2 | 5/2012 | Borntrager et al. |
| 8,353,388 | B2 | 1/2013 | Rice et al. |
| 9,624,078 | B2 | 4/2017 | Cozza |
| 2003/0156935 | A1 | 8/2003 | Mondani et al. |

FOREIGN PATENT DOCUMENTS

| | | |
|---|---|---|
| CN | 211141451 U | 7/2020 |
| CN | 211644498 U | 10/2020 |
| CN | 212151498 U | 12/2020 |
| CN | 112299308 A | 2/2021 |
| CN | 112573441 A | 3/2021 |
| EP | 0 050 119 B1 | 6/1985 |
| JP | 7-260554 A | 10/1995 |
| JP | 9-110395 A | 4/1997 |
| JP | 9-110396 A | 4/1997 |
| WO | 81/02885 A1 | 10/1981 |

OTHER PUBLICATIONS

"Legacy Lift Truck Scale", LTS Scale Company, Retrieved from: https://www.averyweigh-tronix.com/en-IN/products/forklift-truck-scales/ Retrieved on: May 18, 2021 (4 pages total).

LTF Series Weighing Forks, Dini Argeo, Retrieved from: http://www.diniargeo.com/prd/scales/mobile-weighing/lift-truck-forks-en/weighing-forks/ltf-en.aspx Retrieved on: May 18, 2021 (4 pages total).

"Dyna-Lift Series Fork Lift Truck Scale With CSW-10AT", Cambridge Scale Works, Inc., 2015 (2 pages total).

Forklift Truck Scales, Avery Weigh-Tronix LLC, Retrieved from: https://www.averyweigh-tronix.com/en-IN/products/forklift-truck-scales/ Retrieved on: May 18, 2021 (8 pages total).

"Model TR-1-NK-HE Hydraulic Weighing System", Tara Systems, Retrieved from: https://www.tarasystems.com/system54.htm Retrieved on May 18, 2021 (3 pages total).

CLS Series Forklift Scale, Rice Lake Weighing Systems, 2021 (4 pages total).

Scales for forklift trucks, Ravas, Retrieved from: https://www.ravas.com/en-us/products/scales-for-forklift-trucks/ Retrieved on: May 18, 2021 (3 pages total).

* cited by examiner

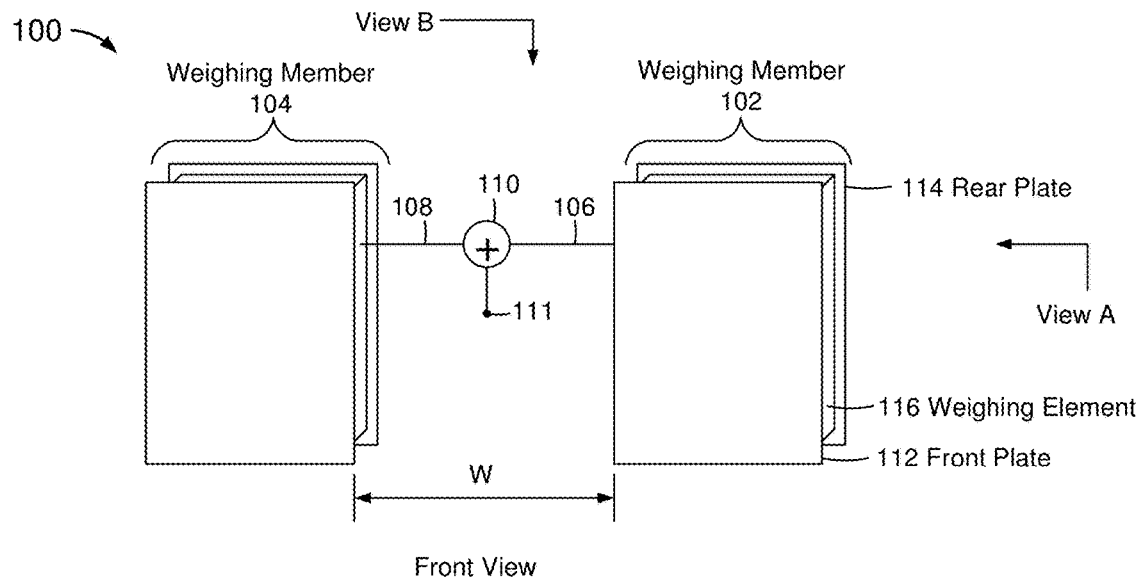
FIG. 1
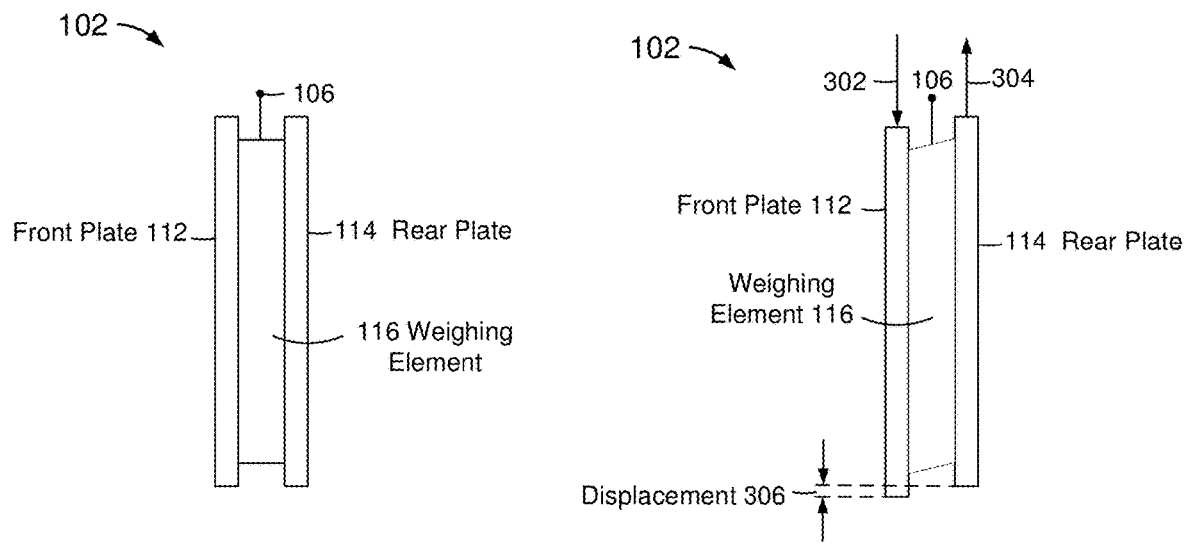
FIG. 2
FIG. 3

ADJUSTABLE WIDTH LIFT AND WEIGH APPARATUS FOR LIFTING MACHINES

BACKGROUND

Industrial lift and weigh devices are designed to permit an engine powered lifting machine (e.g., a forklift) to lift and weigh a load.

Conventional industrial lift and weigh devices are designed for specific engine powered lifting machines. An industrial lift and weigh device designed for one lifting machine is not readily usable with other lifting machines. This is due to differences in width and/or mechanical interconnections.

Industrial lift and weigh devices suffer from non-linear measurements over a range of load weights/masses.

Industrial lift and weigh devices are sensitive to load positioning (e.g., distance of a load from a lifting carriage).

Industrial lift and weigh devices are subject to preload errors (e.g., uneven front and rear plates).

BRIEF DESCRIPTION OF THE DRAWINGS/FIGURES

FIG. 1 is a block diagram of an adjustable width weighing scale that includes first and second weighing members to output respective indications or measures of weight, and a summing device to combine the measures of weight.

FIG. 2 is a side view of one of the weighing members in a rest state.

FIG. 3 is a side view of the weighing member of FIG. 2, in which the front and rear plates are subjected to a shear force to cause a vertical displacement between the front and rear plates.

Figure 4:
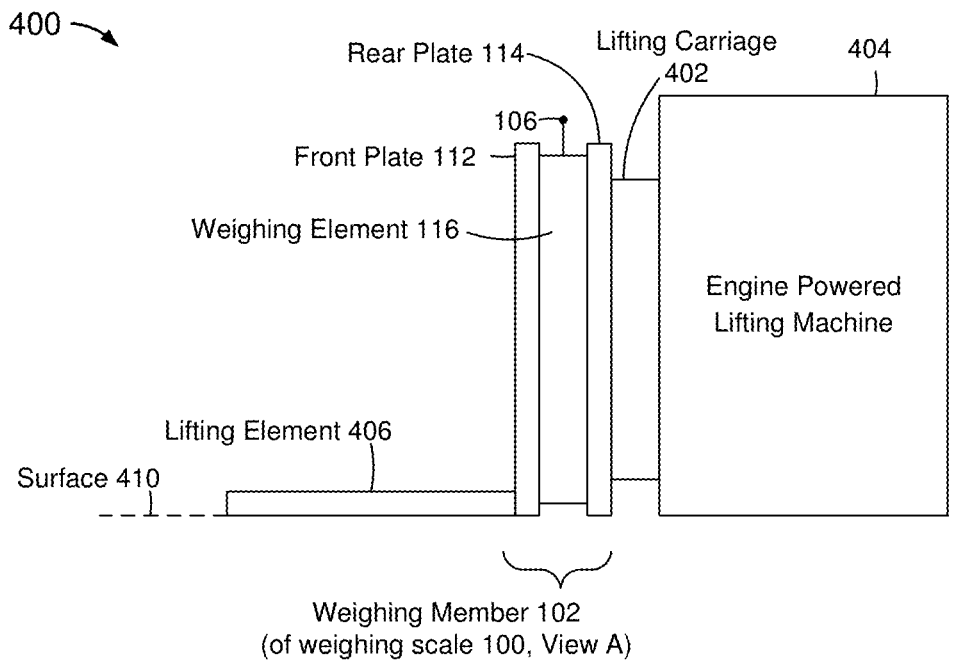
FIG. 4 is a side view of an apparatus that includes the weighing scale of FIG. 1, in the rest state, positioned between a lifting carriage of an engine powered lifting machine and a lifting element.

In the drawings, the leftmost digit(s) of a reference number identifies the drawing in which the reference number first appears.

DETAILED DESCRIPTION

FIG. 1 is a block diagram of a weighing scale 100 that includes first and second weighing members 102 and 104 to output respective indications or measures of weight 106 and 108. Weighing scale 100 further includes a summing device 110 to combine measures of weight 106 and 108 to provide a combined or total measure 111. Summing device 110 may include a parallel resistive network.

Total measure 111 may be provided to an output device, such as a display via a wired or wireless connection. The output device may include one or more application programs to interface with weighing scale 100, such as for calibration purposes.

A width W between first and second weighing members 102 and 104 is configurable such that weighing scale 100 is adaptable for multiple uses or applications (e.g., multiple engine powered lifting machines). Weighing scale 100 may, for example, be constructed as an industrial weighing scale, and width W may be reconfigurable for various engine-powered lifting machines. Weighing scale 100 may also include attachment hardware to accommodate the various engine-powered machines.

In the example of FIG. 1, weighing member 102 includes a front plate 112, a rear plate 114, and a weighing element 116 therebetween. In this example, weighing element 116 may be configured to output electrical measure of weight 106 based upon a relative vertical deflection between front plate 112 and rear plate 114, such as described below with reference to FIGS. 2 and 3. Weighing member 104 may be configured substantially similar or identical to weighing member 102.

FIG. 2 is a side view of weighing member 102 in a rest state (i.e., view A of FIG. 1).

FIG. 3 is a side view of weighing member 102 in which front plate 112 and rear plate 114 are subjected to a difference in force or mass (i.e., a shear force), represented with arrows 302 and 304. The difference in force or mass causes a vertical displacement 306 between front plate 112 and rear plate 114. Weighing element 116 may be configured to convert a measure of displacement 306 into electrical measure of weight 106.

Weighing element 116 may include a load cell. A load cell is a transducer that converts force into a measurable output. Weighing element 116 may include, without limitation, a hydraulic load cell, a pneumatic load cell, and/or a strain gauge load cell. Other type(s) of load cells may also be employed. Measures of weight 106 and 108 may be electrical, hydraulic, and/or gas, depending upon the type(s) of load cell within weighing element 116.

For industrial applications, a strain gauge load cell may be desired. Methods and systems disclosed herein are not, however, limited to strain gauge load cells.

A strain gauge load cell includes a structural member that is designed to deform under a load (e.g., tension and/or compression). A strain gauge load cell outputs an electrical signal (e.g., a voltage) that varies based upon the deformation (e.g., based on changes in electrical resistance). The electrical signal (e.g., voltage) is thus indicative of a weight or mass of the load.

A strain gauge load cell may include multiple strain gauges within. This may improve accuracy. The multiple strain gauges may include a mix of tension and compression-based strain gauges.

FIG. 4 is a side view of an apparatus 400 that includes weighing scale 100 positioned between a lifting carriage 402 of an engine powered lifting machine 404 and a lifting element 406.

Engine powered machine 404 may represent an industrial lifting machine, such as, for example and without limitation, a forklift, a tractor, a front-end loader, or a skid loader or skid-steer loader. Lifting carriage 402 may represent, for example and without limitation, a forklift carriage, lifting arms of a tractor or front-end loader, or lifting arms of a 3-point hitch. Lifting element 406 may represent, for example and without limitation, forks of a forklift, a bucket, a hay bale lifter, and/or other type of lifting element.

In FIG. 4, lifting element 406 rests on a surface 410 such that there is little or no vertical strain or shear on weighing element 116.

Figure 5:
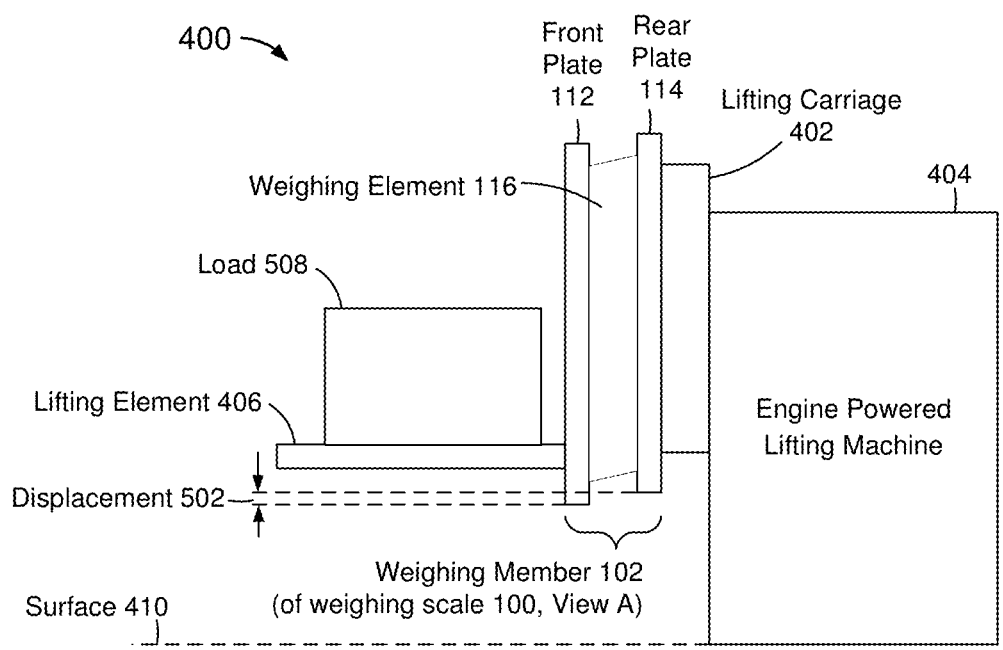
FIG. 5 is a side view of the apparatus of FIG. 4 in which the lifting element is elevated above a surface such that a load exerts a downward force on a weighing element of the weighing scale.

FIG. 5 is a side view of apparatus 400 in which lifting element 406 is elevated above surface 410 by lifting carriage 402, such that a load 508 exerts a downward force on lifting element 406. The downward force results in a vertical displacement 502 between front plate 112 and rear plate 114 of weighing member 102.

A portion of vertical displacement 502 may be due a mass or weight of lifting element 406. This may be compensated for with a calibration procedure.

Figure 6:
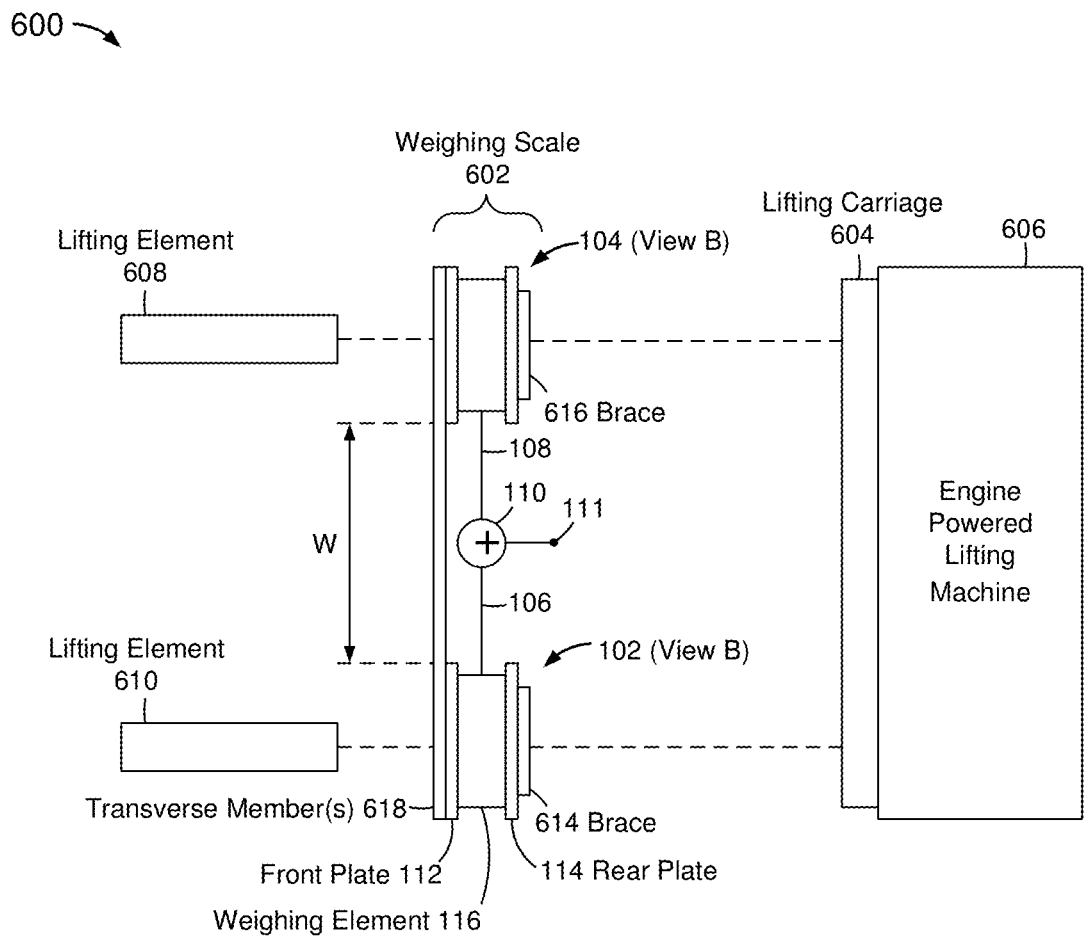
FIG. 6 is a top view of another weighing apparatus that includes a weighing scale positioned between a lifting carriage of an engine powered lifting machine and one or more lifting elements.

FIG. 6 is a top view of a weighing apparatus 600 that includes a weighing scale 602 positioned between a lifting carriage 604 of an engine powered lifting machine 606 and one or more lifting elements, illustrated here as lifting elements 608 and 610. Lifting elements 608 and 610 may represent, without limitation, forks of a forklift.

Weighing scale 602 includes weighing members 102 and 104, illustrated here with respect to view B of FIG. 1.

Weighing scale 602 further includes braces 614 and 616, each configured to attach to the rear plate of a respective one of weighing members 102 and 104, to secure the respective weighing member to lifting carriage 604.

Braces 614 and 616 may be adapted or adaptable to multiple engine powered lifting machines. For example, and without limitation, braces 614 and 616 may be configured to couple directly to lifting carriage 604 of engine powered machine 606 and may be further configured to couple to a quick attach plate of engine powered machine 606 and/or of one or more other engine-powered machines. Examples are provided further below.

Weighing scale 602 further includes one or more transverse members 618 to secure weighing members 102 and 104 to one another, with a variable width W therebetween. Width W may be selected or configured based on a width of engine powered machine 606, a width of lifting carriage 604, a width between connection points or lifting arms of lifting carriage 604, and/or a width between lifting elements 608 and 610.

Transverse member(s) 618 may be adaptable to multiple lifting elements. For example, and without limitation, transverse member(s) 618 may be configured to couple directly to a lifting element(s) 608 and may be further configured to couple to a quick attach plate of one or more other lifting elements. Examples are provided further below.

Figure 7:
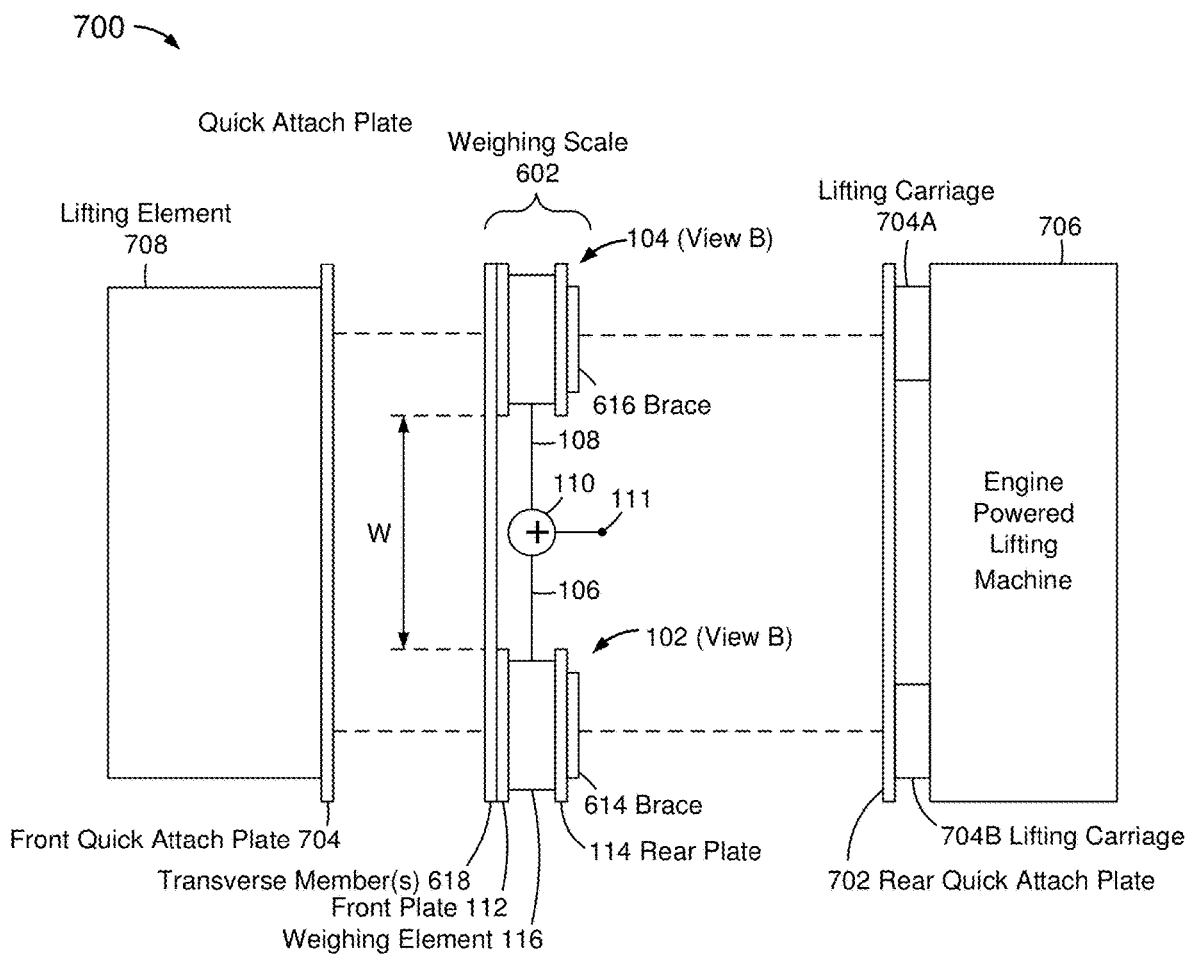
FIG. 7 is a top view of an apparatus, in which the weighing scale of FIG. 6 is positioned between a quick attach plate of an engine powered lifting machine and a quick attach plate of a lifting element.

FIG. 7 is a top view of an apparatus 700, in which weighing scale 602 of FIG. 6 is positioned between a rear quick attach plate 702 of an engine powered lifting machine 706 and a front quick attach plate 704 of a lifting element 708. Example quick attachment plates are provided further below. Rear quick attach plate 702 is coupled to lifting carriages 704A and 704B.

Figure 8:
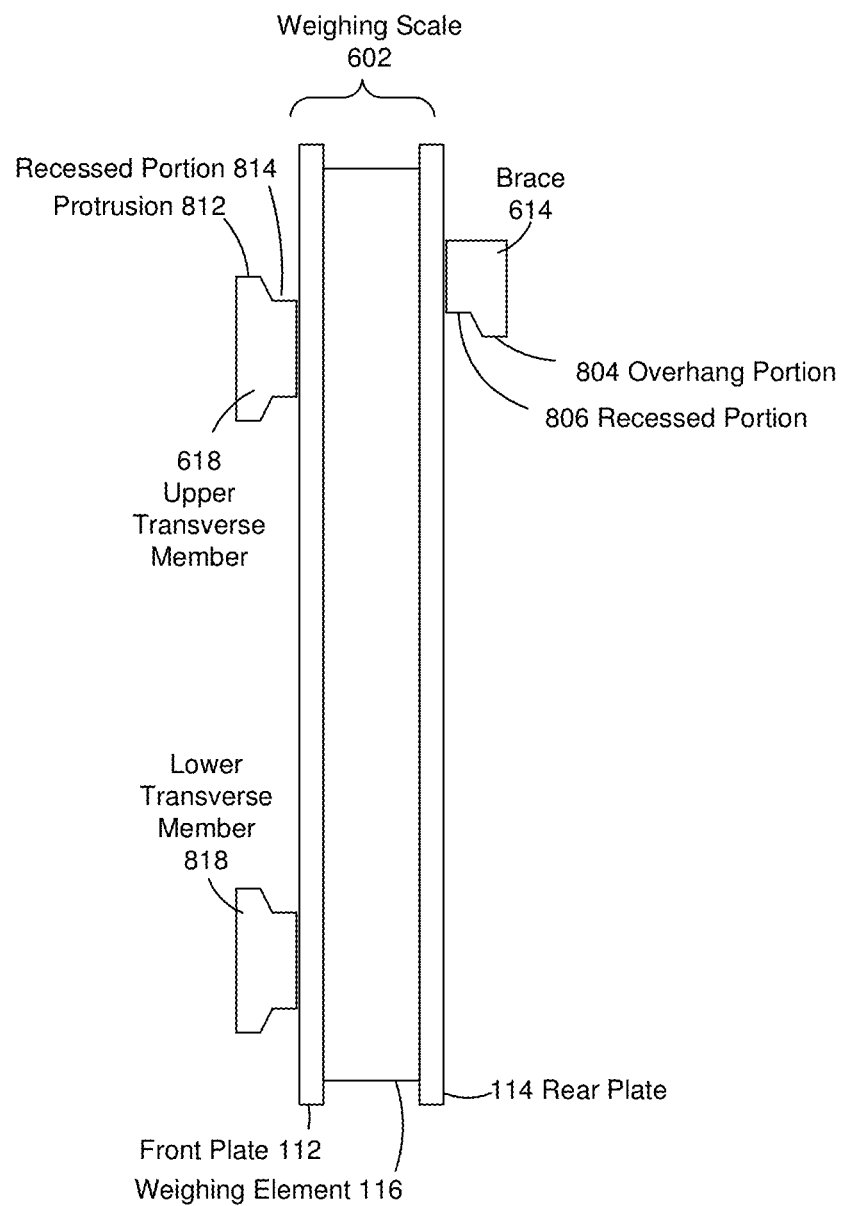
FIG. 8 is an example side view of the weighing scale of FIG. 6.

FIG. 8 is an example side view of weighing scale 602.

In the example of FIG. 8, brace 614 includes an overhang portion 804 and a recessed portion 806. Overhang portion 804 and recessed portion 806 may be configured to hang weighing member 102 from a lifting carriage of an engine powered lifting machine, such as from a cross bar of a lifting carriage of a forklift. A forklift example is provided further below with reference to FIG. 9.

Alternatively, or additionally, overhang portion 804 and recessed portion 806 may be configured to receive and secure an upper portion of a quick attach plate of an engine powered lifting machine. A quick attach example is provided further below with reference to FIG. 10.

Further in the example of FIG. 8, transverse member 618 includes a protrusion 812 and a recessed portion 814. Protrusion 812 and recessed portion 814 may be configured to support forks of a forklift, such as described further below with reference to FIG. 9. Alternatively, or additionally, protrusion 812 and recessed portion 814 may be configured to receive and secure an upper portion of a quick attach plate of a lifting element, such as described further below with reference to FIG. 10.

In FIG. 8, weighing scale 602 includes a second transverse member 818. Second transverse member 818 may be useful to support a lower portion of a lifting element. Transverse member 818 may be identical to, and interchangeable with transverse member 618. This may be useful for wear-leveling purposes, such that transverse members 618 and 818 may be switched or swapped with one another when one of transverse members 618 and 818 becomes worn or damaged. Transverse member 618 may be referred to herein as an upper transverse member, and transverse member 818 may be referred to herein as a lower transverse member.

Figure 9:
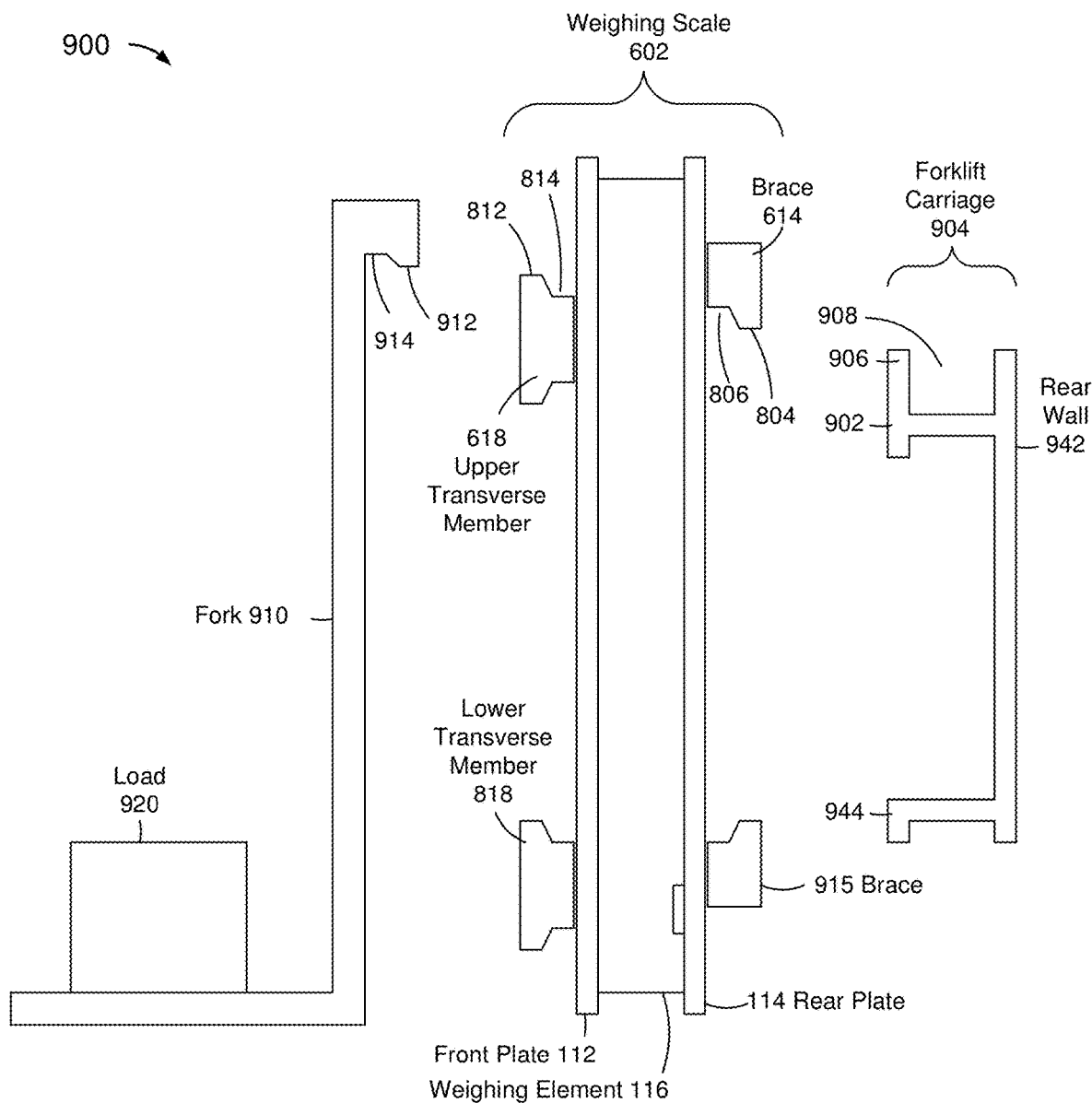
FIG. 9 is a side view of another weighing apparatus that includes the weighing scale described with reference to FIG. 8, positioned between a forklift carriage and a fork.

FIG. 9 is a cross-sectional side view of a weighing apparatus 900 that includes weighing scale 602, as described above with reference to FIG. 8, positioned between a forklift carriage 904 and a fork 910. A forklift may raise forklift carriage 904 to weigh a load 920.

In the example of FIG. 9, forklift carriage 904 includes a rear wall 942, a crossbar 902 having an upper edge 906, and a cavity 908. Fork 910 includes an overhang portion 912 and a recessed portion 914. Overhang portion 912 and recessed portion 914 of fork 910 are configured to permit fork 910 to hang from upper edge 906 of crossbar 902. Absent weighing scale 602, fork 910 may thus hang directly on crossbar 902.

Further in the example of FIG. 9, overhang portion 804 and recessed portion 806 of brace 614 are also configured to hang on crossbar 902. An extension 944 from a lower portion of forklift carriage 904 may rest against rear plate 114. Weighing apparatus 900 may further include a second brace 915 to support the lower portion of forklift carriage 904.

Further in the example of FIG. 9, protrusion 812 and recessed portion 814 of upper transverse member 618 are configured to mate with recessed portion 914 and overhang portion 912, respectively, of fork 910, such that fork 910 may hang on upper transverse member 618. A lower portion of fork 910 may rest against lower transverse member 818.

Figure 10:
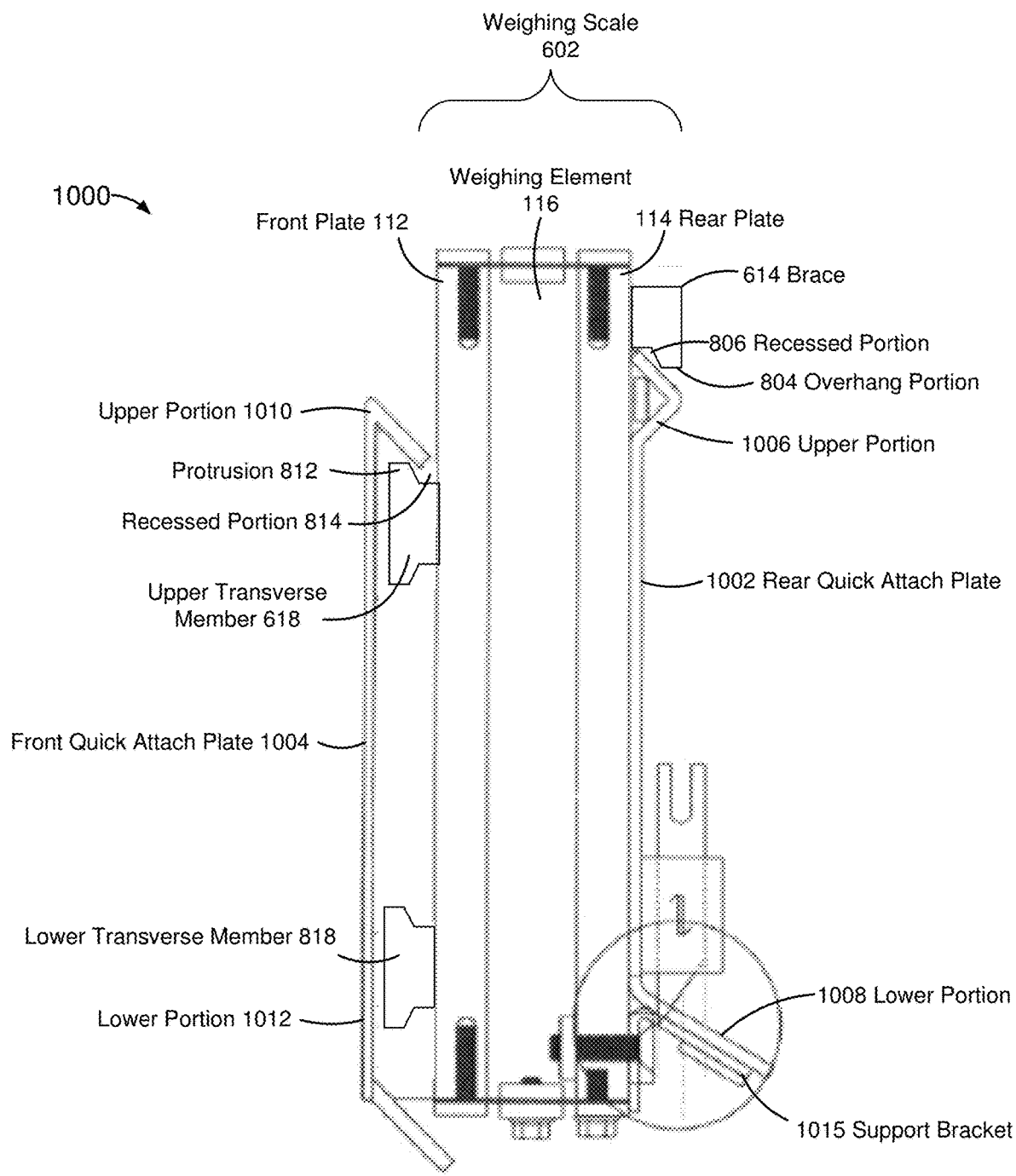
FIG. 10 is a side view of another weighing apparatus that includes the weighing described above with reference to FIG. 8, positioned between a rear quick attach plate and a front quick attach plate.

FIG. 10 is a side view of a weighing apparatus 1000 that includes weighing scale 602, as described above with reference to FIG. 8, positioned between a rear quick attach plate 1002 and a front quick attach plate 1004. Rear quick attach plate 1002 may be coupled to an engine powered machine and front quick attach plate 1004 may be coupled to a lifting element.

In the example of FIG. 10, an upper portion 1006 of rear quick attach plate 1002 is secured within recessed portion 806 by overhang portion 804 of brace 614.

Further in the example of FIG. 10, weighing apparatus 1000 includes a support bracket 1015, and a lower portion 1008 of rear quick attach plate 1002 is secured to support bracket 1015.

Further in FIG. 10, an upper portion 1010 of front quick attach plate 1004 rests within recessed portion 814 of upper transverse member 618, such that front quick attach plate 1004 hangs from upper transverse member 618. A lower portion 1012 of front quick attach plate 1004 rests against lower transverse member 818. Lower portion 1012 of front quick attach plate 1004 may be secured to lower transverse member 818 and/or to front plate 112.

. . . may omit front quick attach plate 1004, such as to hang forks on protrusion 812 . . .

Figure 11:
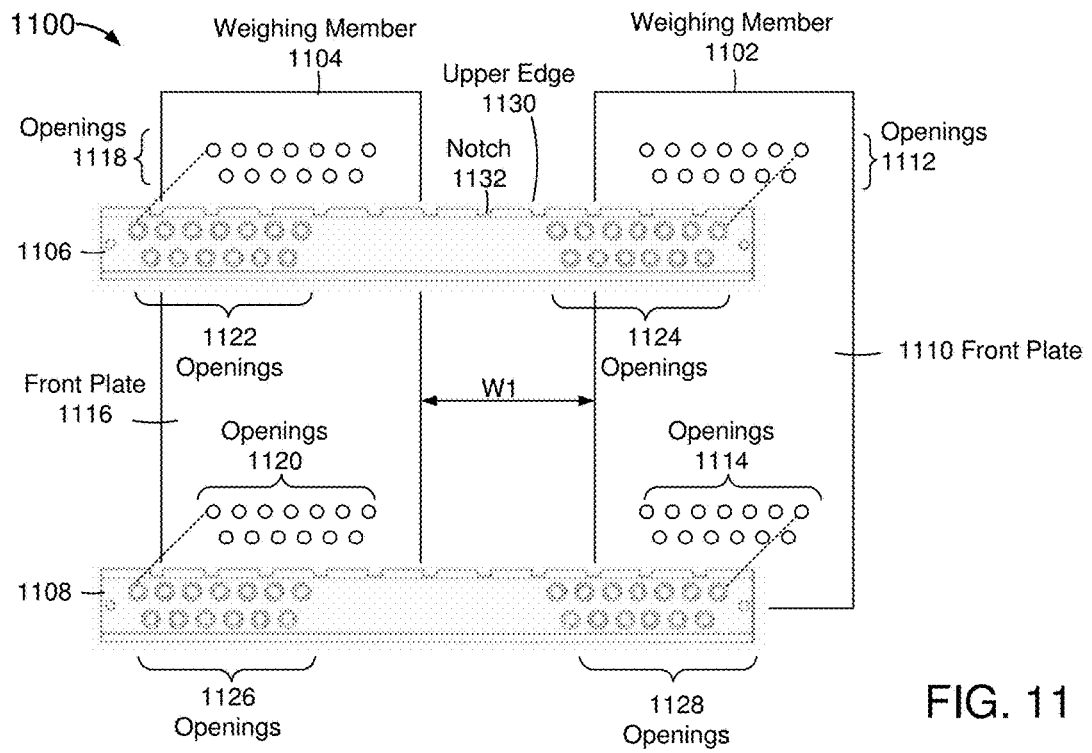
FIG. 11 is a front view of another weighing apparatus that includes first and second weighing members and upper and lower transverse members, configured to provide a width W1 between weighing the members.

FIG. 11 is a front view of a weighing apparatus 1100 that includes first and second weighing members 1102 and 1104, and upper and lower transverse members 1106 and 1108.

In the example of FIG. 11, a front plate 1110 of weighing member 1102 has upper and lower sets of openings 1112 and 1114. A front plate 1116 of weighing member 1104 has upper and lower sets of openings 1118 and 1120. Upper transverse member 1106 has first and second sets of openings 1122 and 1124. Lower transverse member 1108 has first and second sets of openings 1126 and 1128. Further in the example of FIG. 11, the openings of transverse members 1106 and 1108 are aligned with the openings of weighing members 1102 and 1104 to provide a width W1 between weighing members 1102 and 1104.

Upper transverse member 1106 further include notches 1132 along an upper edge 1130. Notches 1132 may be useful to preclude horizontal slippage of forks hung on upper transverse member 1106. Lower transverse member 1108 may have similar notches.

Figure 12:
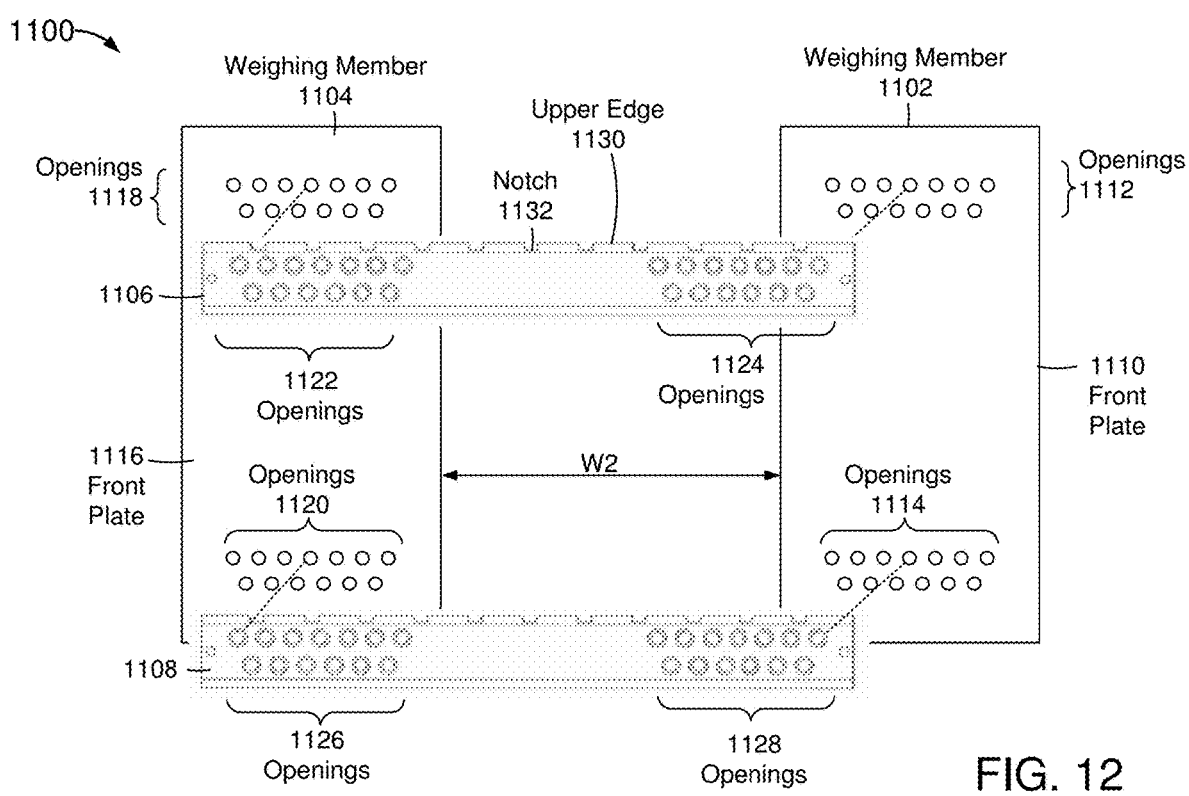
FIG. 12 is another front view of the weighing apparatus of FIG. 11, in which the weighing members and the transverse members are configured to provide a width W2 between the weighing members.

FIG. 12 is another front view of weighing apparatus 1100, in which the openings of transverse members 1106 and 1108 are aligned with the openings of weighing members 1102 and 1104 to provide a width W2 between weighing members 1102 and 1104, where width W2 is greater than width W1 in FIG. 11.

The openings of front plates 1110 and 1116 may be threaded to permit transverse members 1106 and 1108 to be releasably attached to weighing members 1102 and 1104 with threaded bolts. Methods and systems disclosed herein are not, however, limited to this example.

Figure 13:
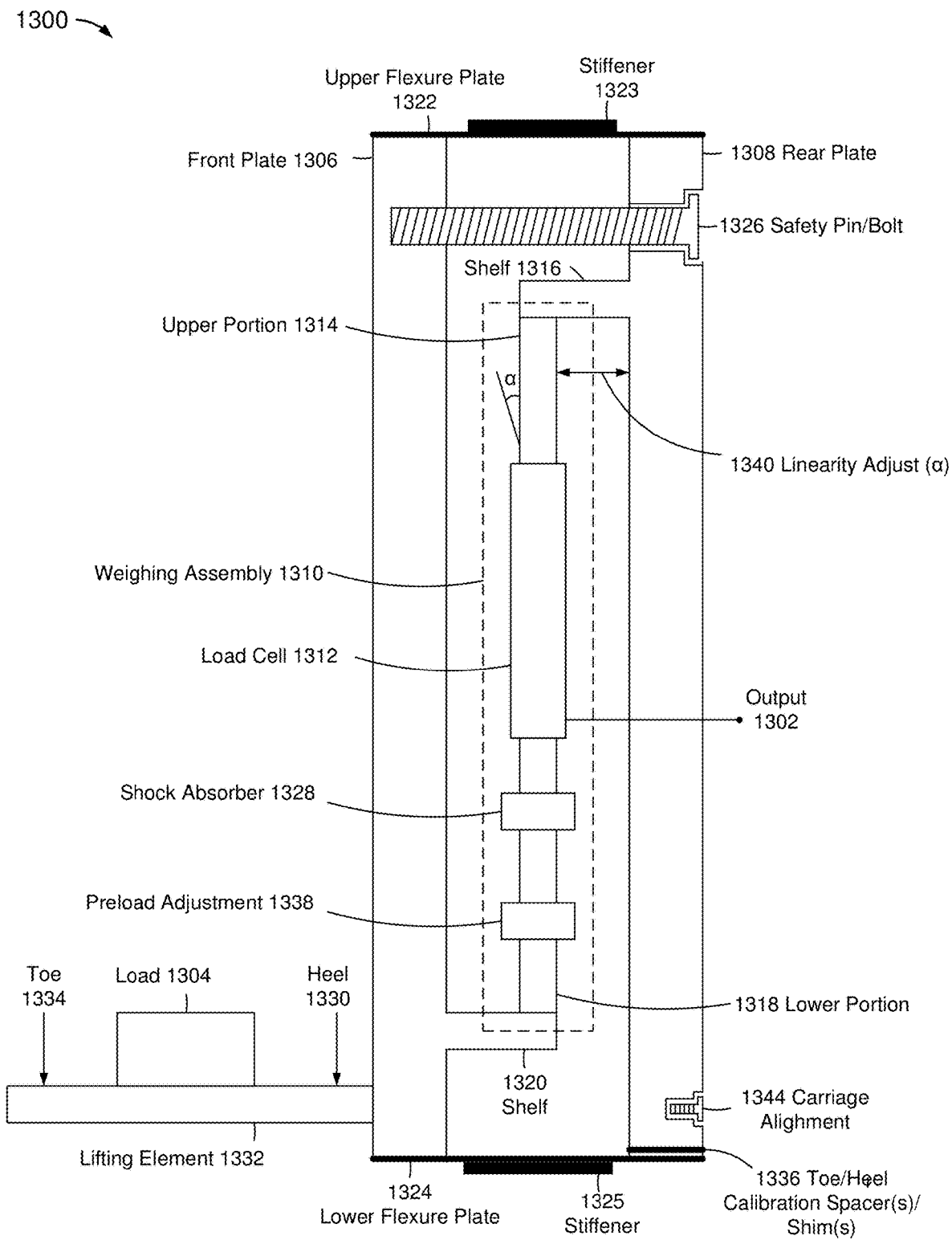
FIG. 13 is a cross-sectional side view of an example weighing member.
Figure 14:
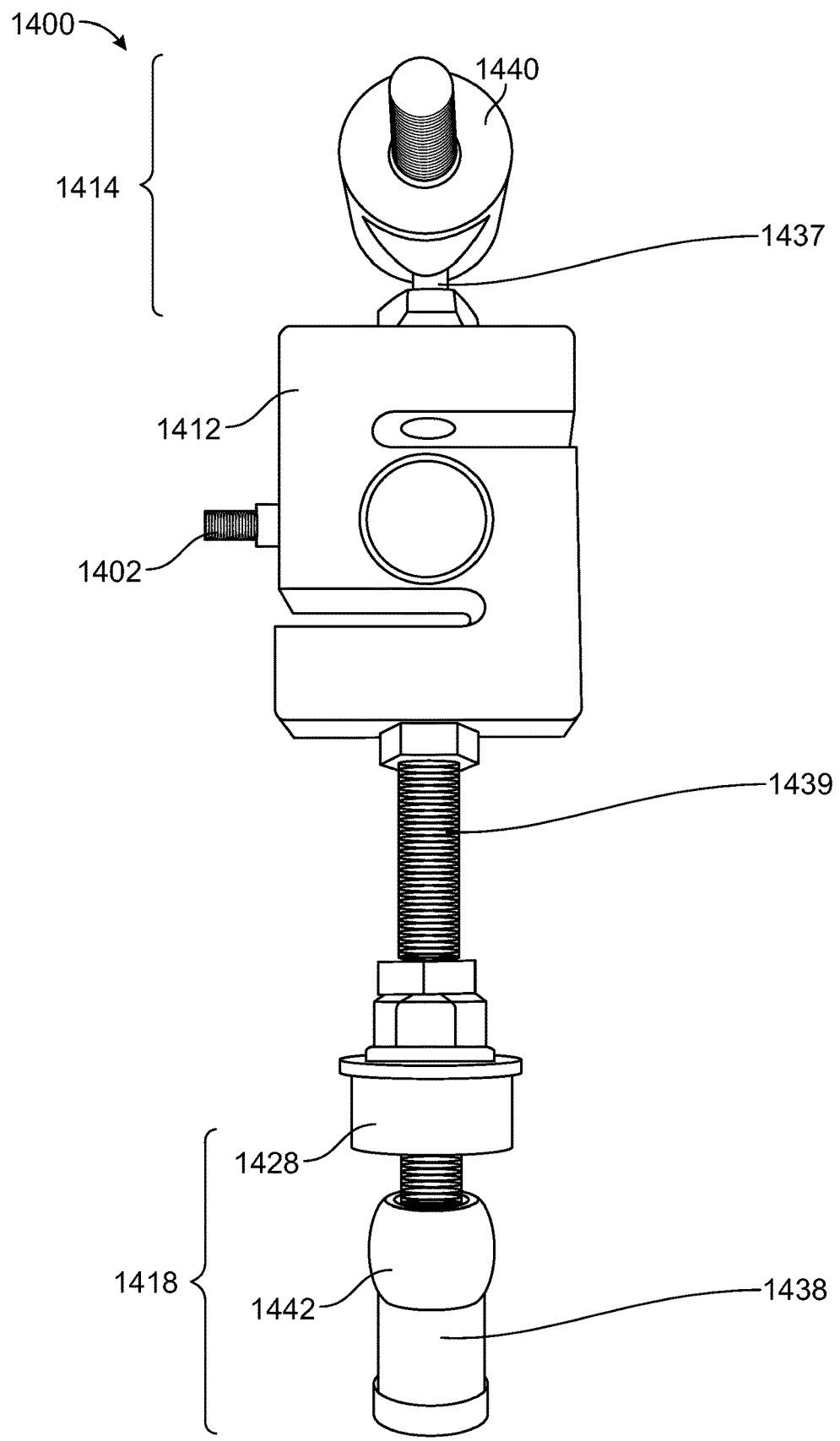
FIGS. 14-17 are images of various perspectives of an example weighing assembly.
Figure 15:
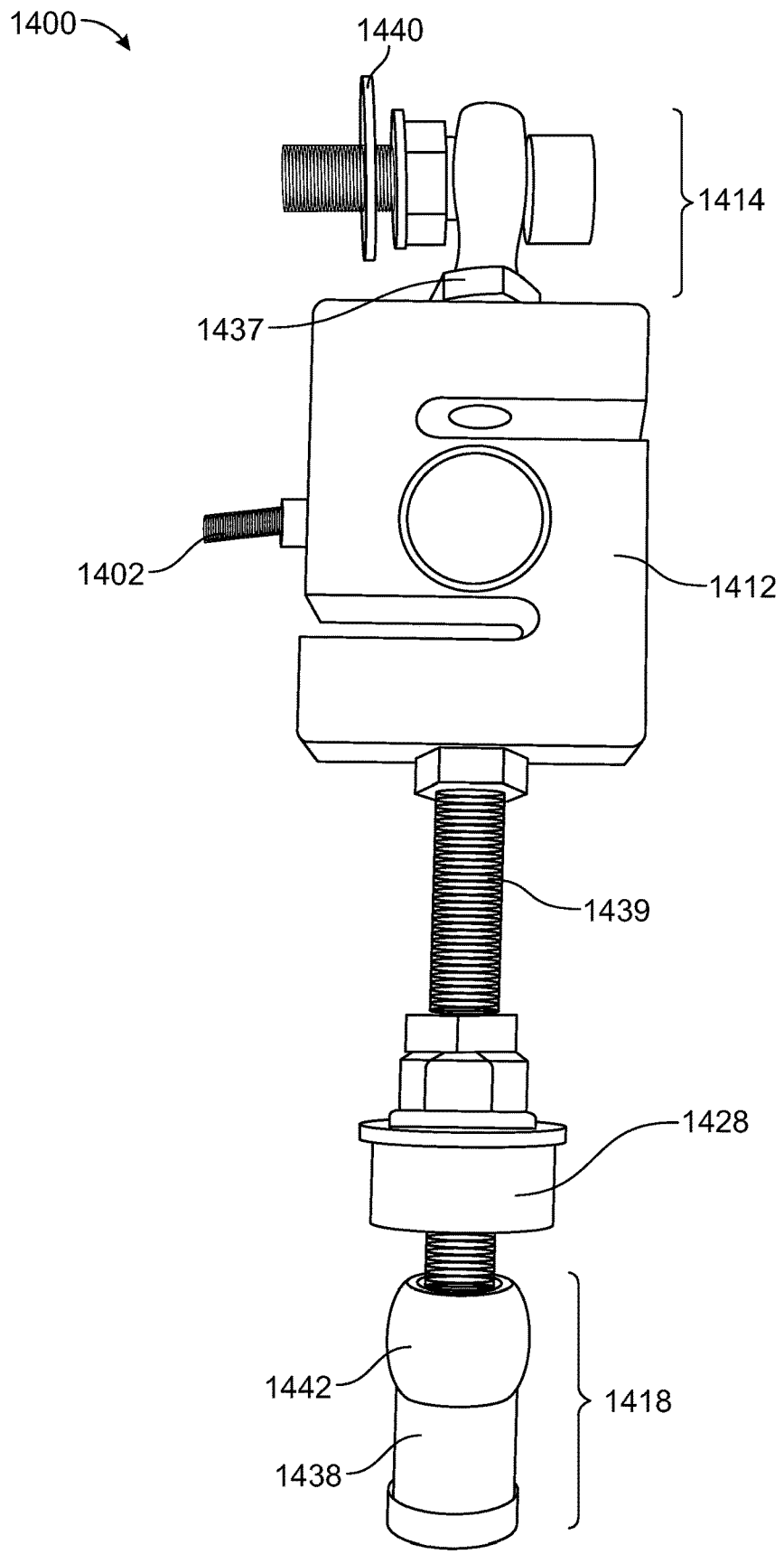
Figure 16:
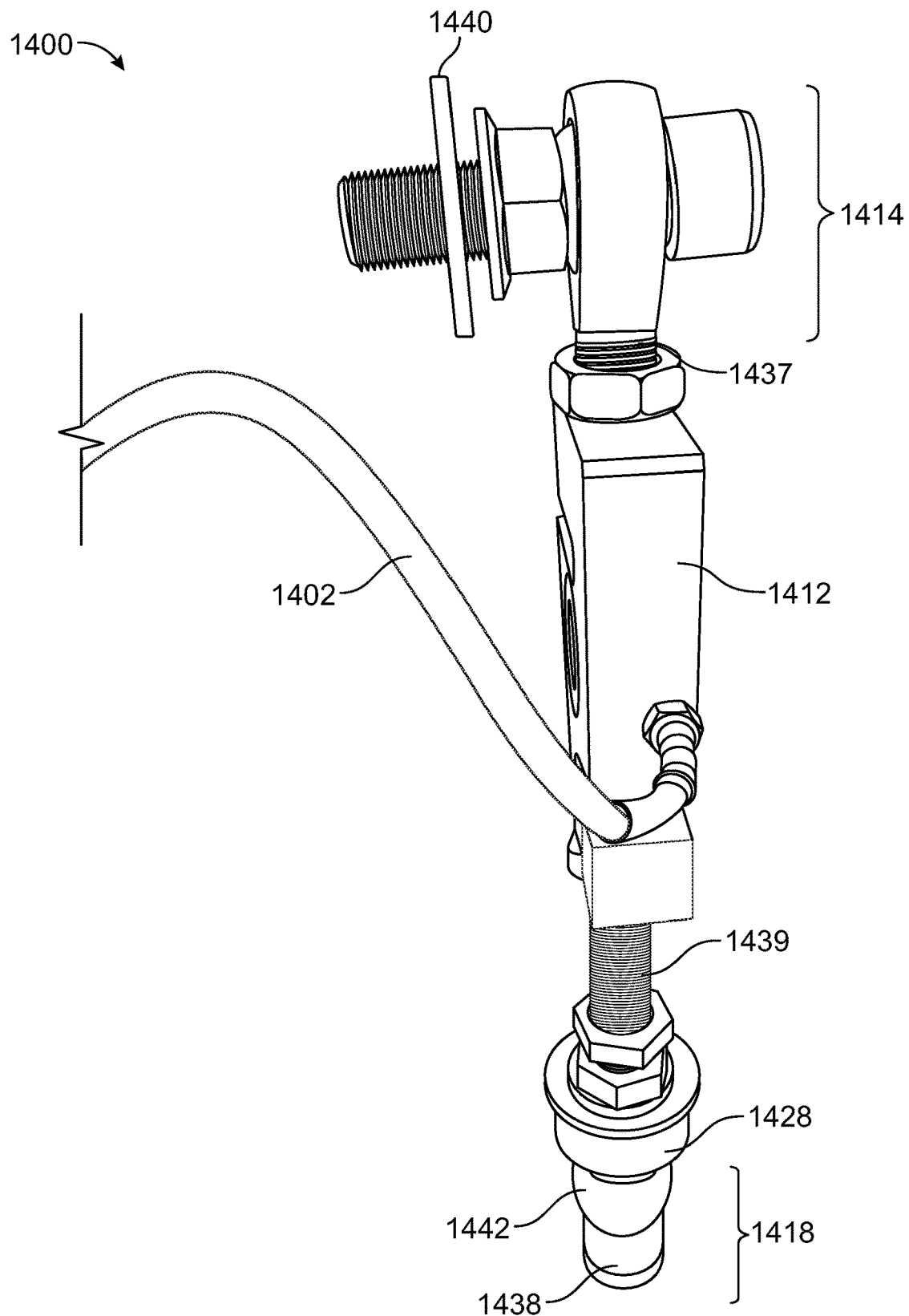
Figure 17:
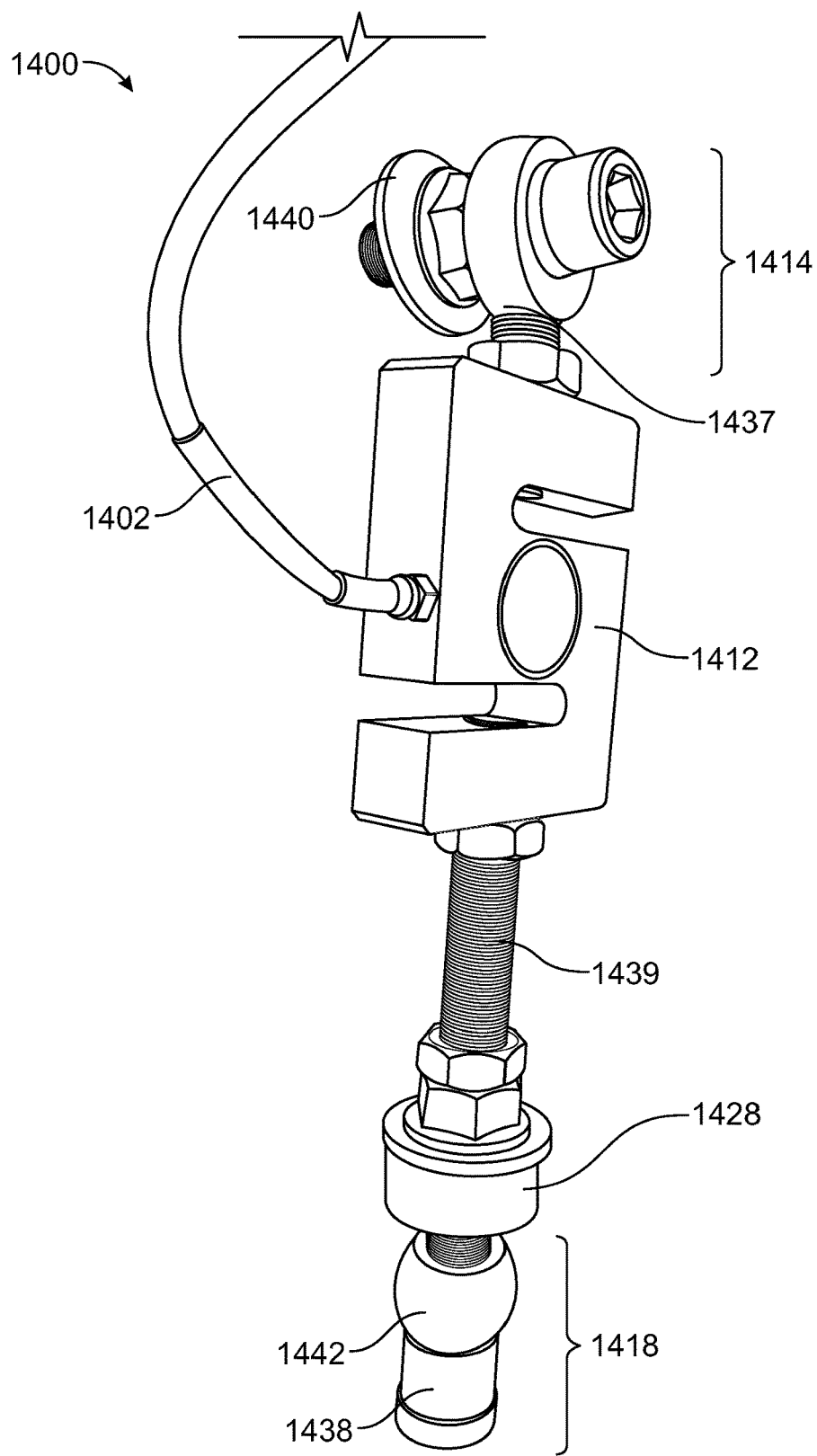

FIG. 13 is a cross-sectional side view of a weighing member 1300 to output an indication of a weight/mass of a load 1304 at an output 1302.

Weighing member 1300 includes a front plate 1306, a rear plate 1308, and a weighing element or assembly 1310 therebetween. Weighing assembly 1310 includes a load cell 1312 to determine the weight/mass of load 1304.

Weighing member 1300 further includes an upper flexure plate 1322 and a lower flexure plate 1324, to maintain a distance between front plate 1306 and rear plate 1308. Flexure plates 1322 and 1324 may be configured to maintain front plate 1306 and rear plate 1308 parallel with one another. Flexure plates 1322 and 1324 may be relatively flexible and may include a relatively thin layer of metal (e.g., 0.050-inch-thick steel). Flexure plates 1322 and 1324 may be configured to permit vertical movement of front and rear plates 1306 and 1308, relative to one another. Flexure plates 1322 and 1324 and front and rear plates 1306 and 1308 may be configured to maintain a parallelogram shape when front and rear plates 1306 and 1308 are vertically deflected relative to one another due to load 1304.

Flexure plates 1322 and 1324 may be releasably attached to front and rear plates 1306 and 1308, such as with threaded bolts. This may be useful in the event that flexure plate 1322 and/or 1324 becomes damaged and needs replacement.

Weighing member 1300 may further include stiffener plates 1323 and 1325 to provide rigidity to central portions of flexure plates 1322 and 1324.

Weighing member 1300 further includes a safety feature to preclude separation of front and rear plates 1306 and 1308 from one another if flexure plate 1322 and/or flexure plate 1324 were to fail. In the example of FIG. 13, the safety feature includes a safety pin or bolt 1326. Under normal conditions, safety pin 1326 is not subjected to loading. For example, in FIG. 13, one end of safety pin 1326 is threaded into a cavity of front plate 1306, and a head end of safety pin 1326 is loosely retained within a countersunk opening of rear plate 1308. The safety feature is not, however, limited to this example. A safety pin may, for example, be threaded into a cavity of rear plate 1308, and a head end of the safety pin may be loosely retained within a countersunk opening of front plate 1306. As another example, the safety feature may include a chain secured to front plate 1306 and rear plate 1308.

In the example of FIG. 13, an upper portion 1314 of weighing assembly 1310 is coupled to a shelf 1316 that extends from an upper portion of rear plate 1308, and a lower portion 1318 of weighing assembly 1310 is coupled to a shelf 1320 that extends from a lower portion of front plate 1306. Shelf 1316 and/or shelf 1320 may be replaced with an element that is integral to weighing assembly 1310. For example, and without limitation, in place of shelf 1316, upper portion 1314 of weighing assembly 1310 may include a horizontal extension (e.g., a bolt), configured to screw into rear plate 1308, an example of which is provided further below.

Weighing member 1300 may further include a shock absorber 1328. Shock absorber 1328 may be useful to protect load cell 1312 and/or load 1304 in the event of a sudden change in vertical force applied to front plate 1306 and/or rear plate 1308.

Weighing member 1300 may further include one or more adjustable elements, such as for calibration and/or alignment purposes, examples of which are provided below.

In some situations, output 1302 may be impacted by a distance between load 1304 and front plate 1306 (e.g., positioning load 1304 at a heel 1330 of a lifting element 1332 versus a toe 1334). In an embodiment, spacers or shims may be placed between upper flexure plate 1322 and front or rear plate 1306 or 1308, and/or between lower flexure plate 1324 and front or rear plate 1306 or 1308. The spacers or shims essentially deform the parallelogram shape of weighing member 1300 to render output 1302 relatively independent of the distance between load 1314 and front plate 1306. In the example of FIG. 13, a spacer or shim 1336 is positioned between lower flexure plate 1324 and rear plate 1308.

In an embodiment, weighing assembly 1310 includes a preload adjustment 1338 to adjust or reduce a vertical difference between front and rear plates 1306 and 1308 (e.g., to maintain front and rear plates 1306 and 1308 at a same level). Preload adjustment 1338 may be configured to adjust a length of weighing assembly 1310. Preload adjustment may include a threaded and/or telescoping component.

In an embodiment, weighing assembly 1310 includes a linearity calibrator or adjust 1340. Linearity adjust 1340 may be configured to control an angle of weighing assembly 1310 relative to front plate 1306 and/or rear plate 1308. Linearity adjust 1340 may include a threaded and/or telescoping component that extends between weighing assembly 1310 and front plate 1306 or rear plate 1308.

Weighing member 1300 may further include one or more carriage alignment elements 1344 to control a distance or space between a lower portion of rear plate 1308 and a lifting carriage of an engine powered lifting machine. Carriage alignment element(s) 1344 may be useful to compensate for unevenness of the lifting carriage of the engine powered lifting machine. Carriage alignment element(s) 1344 may include a threaded bolt that may be rotated to cause the threaded bolt to extend outwardly from rear plate 1308.

Weighing member 1300 may further include a clinometer to measure a tilt angle of weighing member 1300. In this example, output 1302 and an output of the clinometer may be provided to a device that includes a calibration application to correct for the tilt angle. The clinometer may be positioned near load cell 1312 and/or may be integrated with load cell 1312.

Relative locations or positioning of features of weighing assembly 1310 illustrated in FIG. 13, are arbitrary. For example, load cell 1312, shock absorber 1328, preload adjustment 1338, and/or linearity adjust 1340, may be located or positioned anywhere along a length of weighing assembly 1310. Examples are provided further below.

FIGS. 14-17 are images of various perspectives of a weighing assembly 1400. Weighing assembly 1400 is an example embodiment of weighting member 1300 in FIG. 13.

Weighing assembly 1400 includes a load cell 1412, illustrated here as a commercially available S-type load cell to provide an electronic output or measure 1402 of weigh/mass.

An upper portion 1414 of weighing assembly 1400 includes a first rod 1437 extending from load cell 1402 having a perpendicular threaded component configured to screw into a rear plate of a weighing assembly.

Upper portion 1414 of weighing assembly 1400 further includes a linearity adjust 1440, illustrated here as a spacer or washer. One or more washers may be added or removed to control angle as described further above with respect to linearity adjust 1340 in FIG. 13.

A lower portion 1418 of weighing assembly 1400 includes second rod 1439 extending from load cell 1402 configured to attach to a front plate of a weighing assembly. Lower portion 1418 further includes a ball 1442 that is configured to fit within a cavity or cup of an underside of a shelf of a lower portion of a front plate of a weighing assembly (e.g., shelf 1320 of front plate 1306 in FIG. 13).

Weighing assembly 1400 further includes a preload adjustment 1438, illustrated here as a threaded component configured to adjust a relative vertical position of ball 1442.

Weighing assembly 1400 further includes a shock absorber 1428, such as described above with reference to shock absorber 1328 in FIG. 13.

Figure 18:
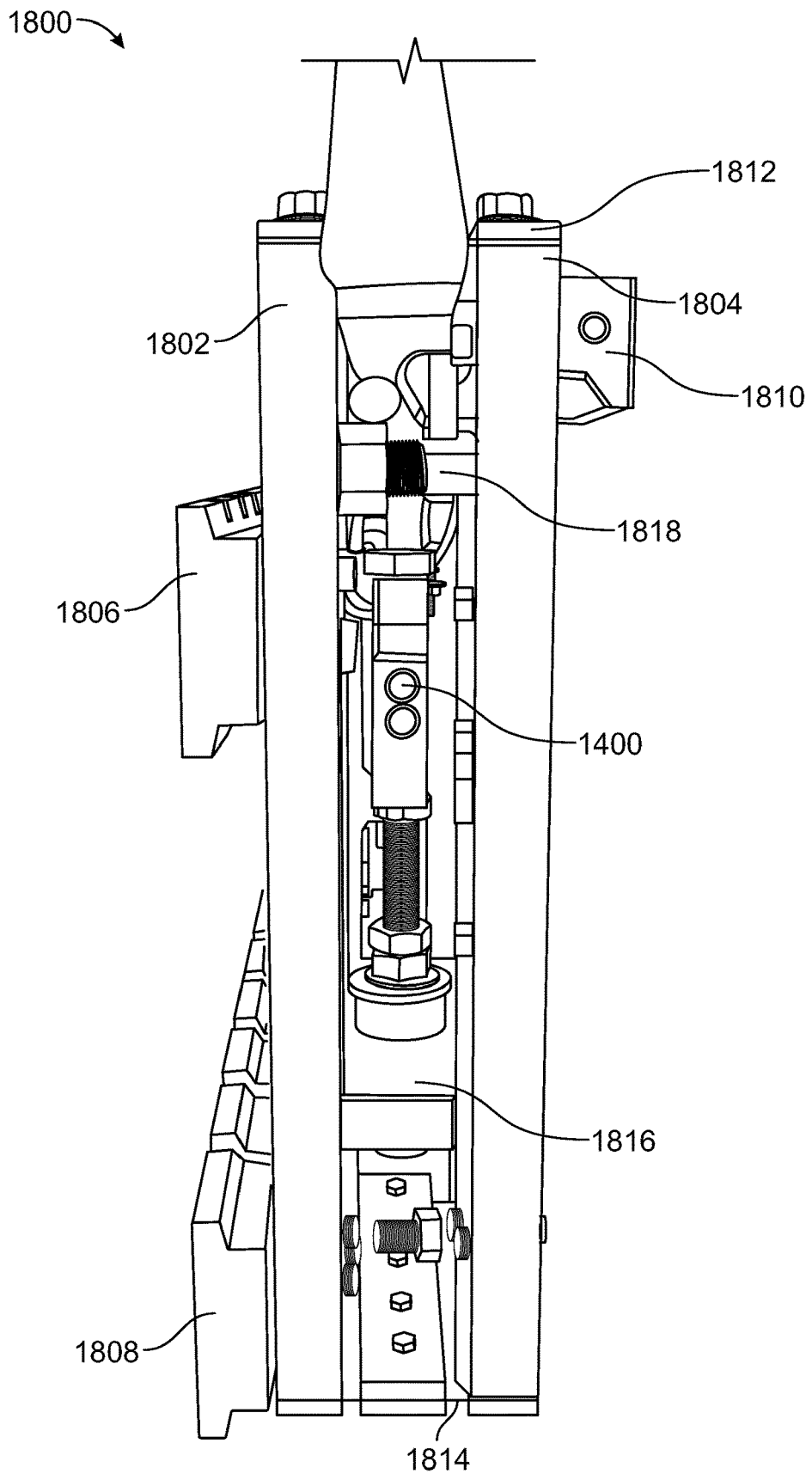
FIG. 18 is a side view image of another weighing scale.

FIG. 18 is a side view image of a weighing scale 1800.

Figure 19:
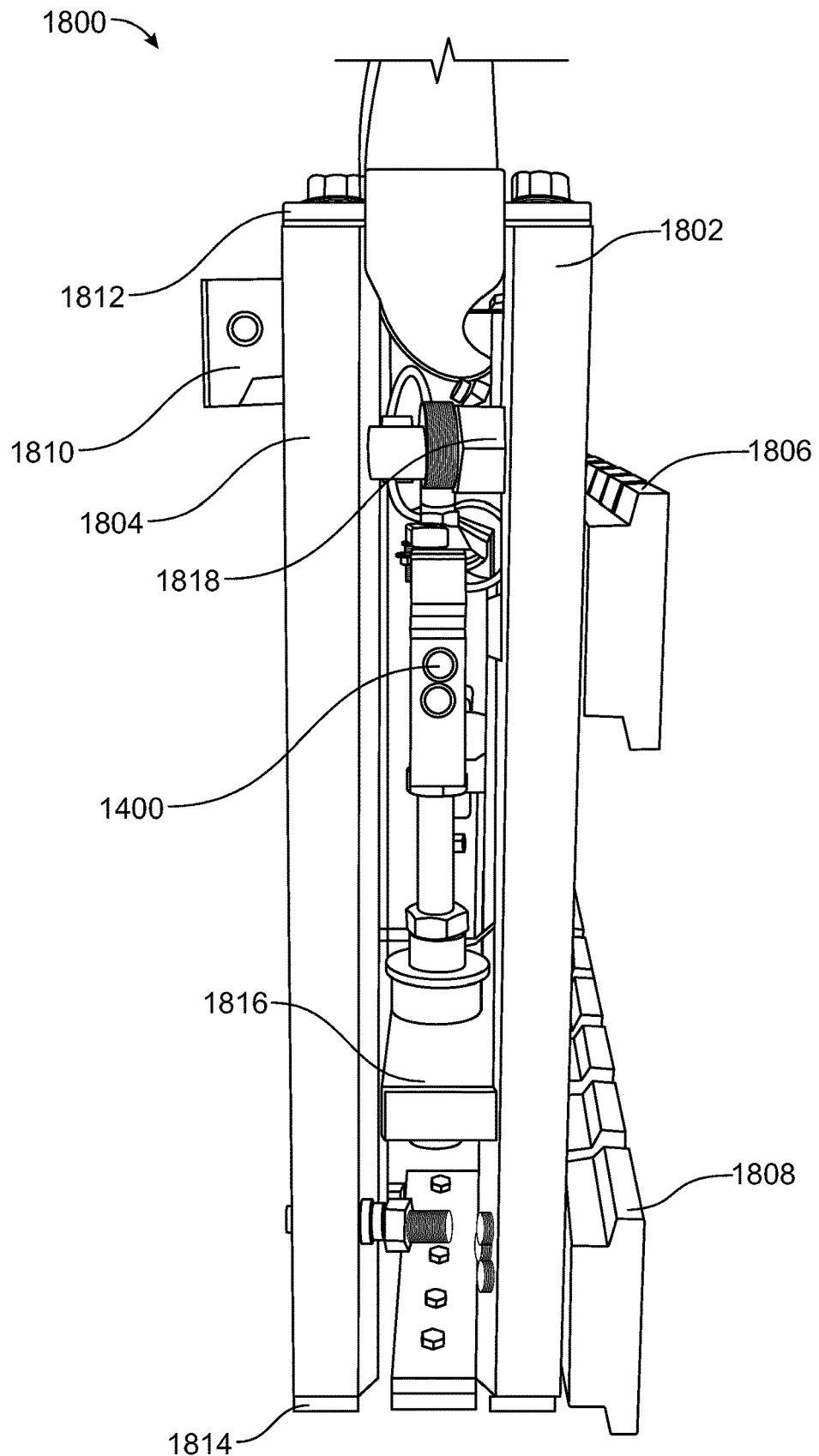
FIG. 19 is an opposing side view image of the weighing scale of FIG. 18.

FIG. 19 is an opposing side view image of weighing scale 1800.

Figure 20:
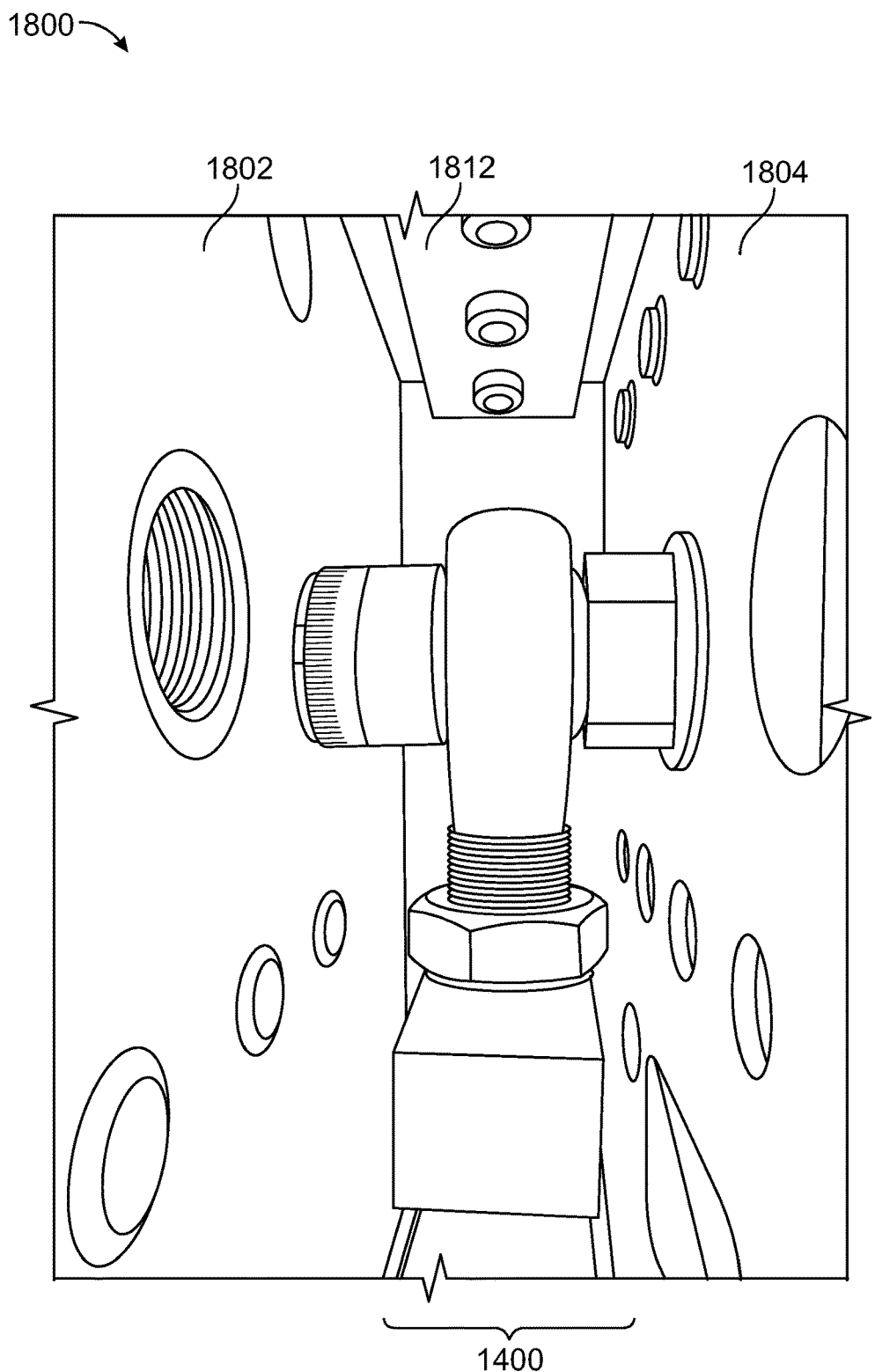
FIG. 20 is an expanded side view image of the weighing scale of FIG. 18.

FIG. 20 is an expanded side view image of weighing scale 1800.

Weighing scale 1800 includes weighing assembly 1400 positioned between a front plate 1802 and a rear plate 1804. A lower end of weighing assembly 1400 is coupled to a shelf 1816 of front plate 1802. An upper end of weighing assembly 1400 is coupled to rear plate 1804, such as described in one or more examples herein.

Weighing scale 1800 further includes upper and lower transverse members 1806 and 1808 mounted to front plate 1802.

Weighing scale 1800 further includes a brace 1810 mounted to rear pate 1804.

Weighing scale 1800 further includes upper and lower flexure plates 1812 and 1814 to maintain front and rear plates 1802 and 1804 parallel with one another.

Weighing scale 1800 further includes a safety pin/bolt 1818, such as described above with respect to safety pin/bolt 1326 in FIG. 13.

Figure 21:
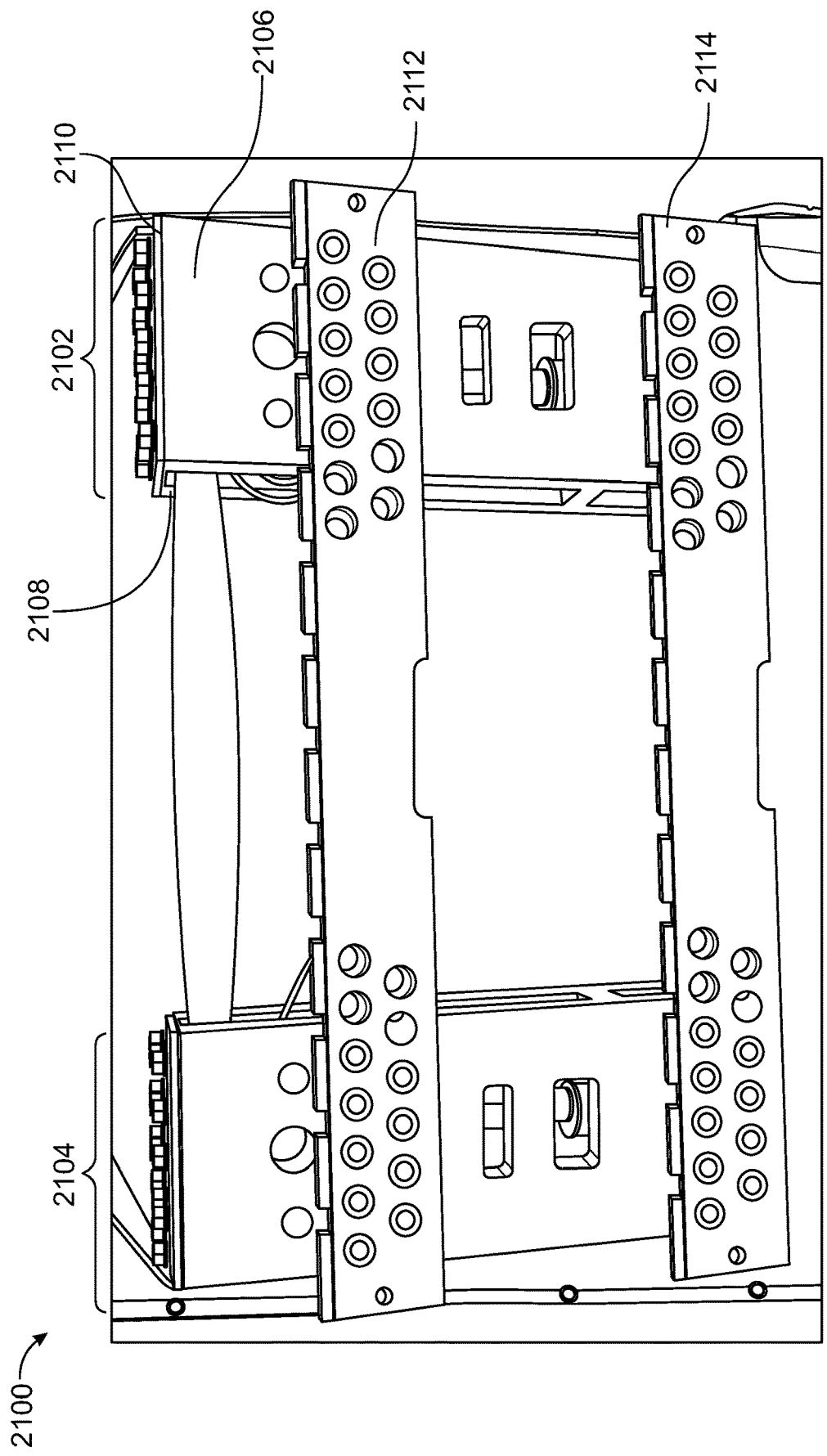
FIG. 21 is a front view image of the weighing scale of FIG. 18.

FIG. 21 is a front view image of a weighing scale 2100 that includes first and second weighing members 2102 and 2104. First weighing member 2102 includes a front plate 2106, a rear plate 2108, and a flexure plate 2110. Second weighing member 2104 may be substantially similar or identical to first weighing member 2102. Weighing scale 2100 further includes an upper transverse member 2112 and a lower transverse member 2114.

Figure 22:
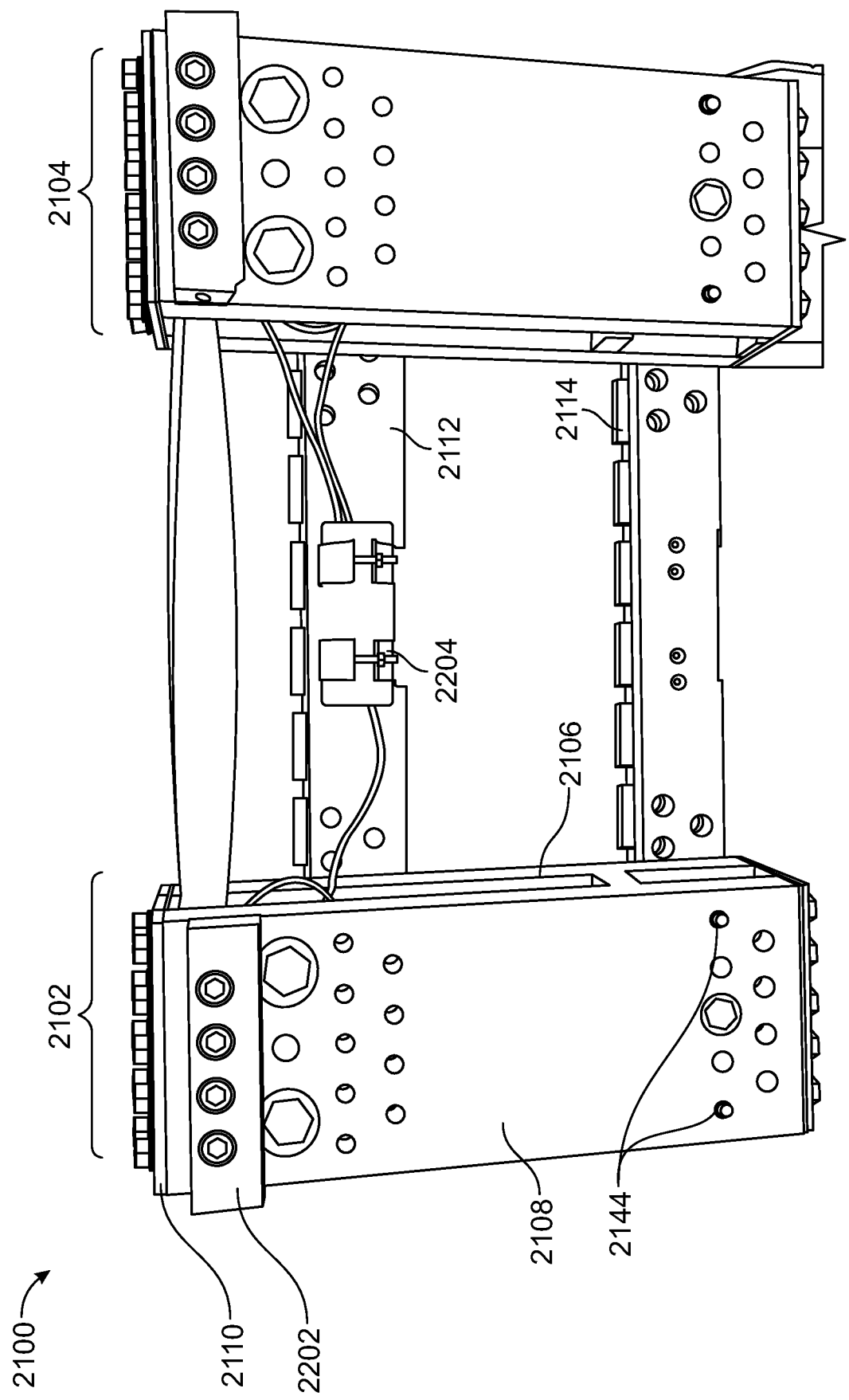
FIG. 22 is a rear-view image of the weighing scale of FIG. 18.

FIG. 22 is a rear-view image of weighing scale 2100, in which weighing member 2102 further includes a brace 2202 attached to rear plate 2108, and carriage alignment 2144.

In FIG. 22, weighing scale 2100 further includes a summing circuit 2204 to sum electrical outputs of first and second weighing member 2102 and 2104.

Figure 23:
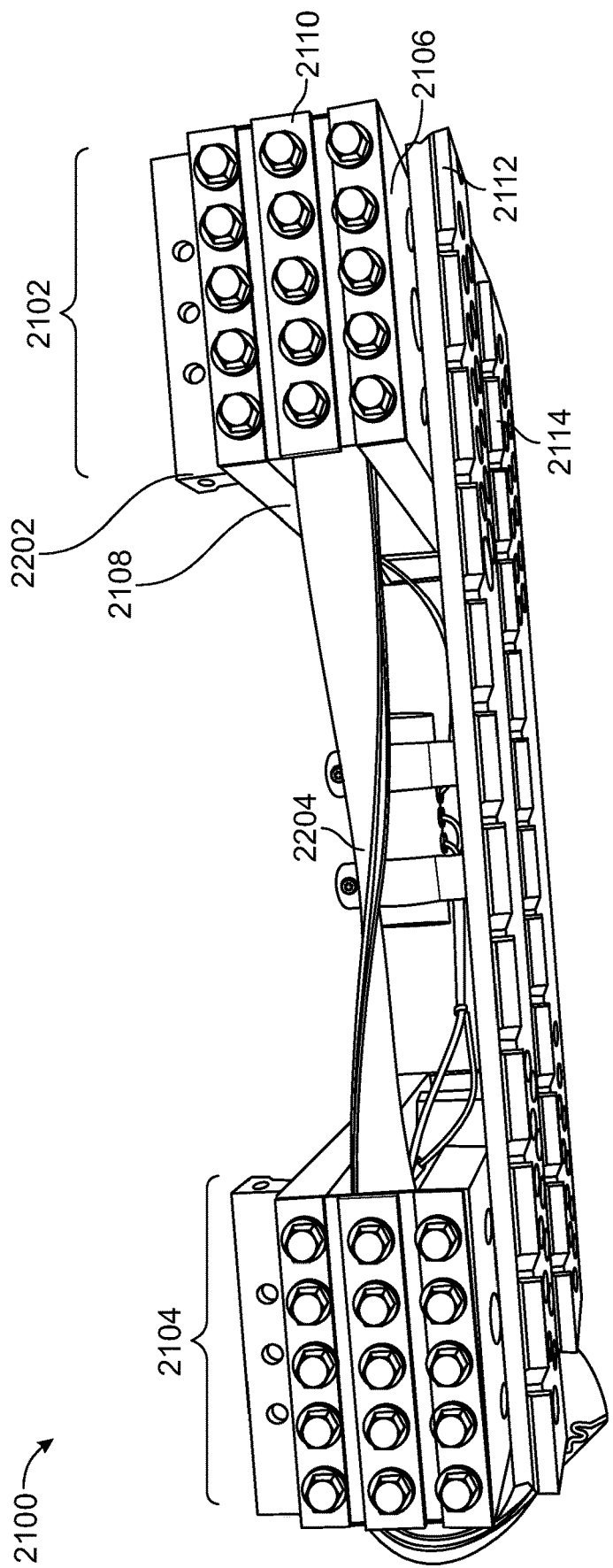
FIG. 23 is a top look-down view image of the weighing scale of FIG. 18.

FIG. 23 is a top look-down view image of weighing scale 2100.

Figure 24:
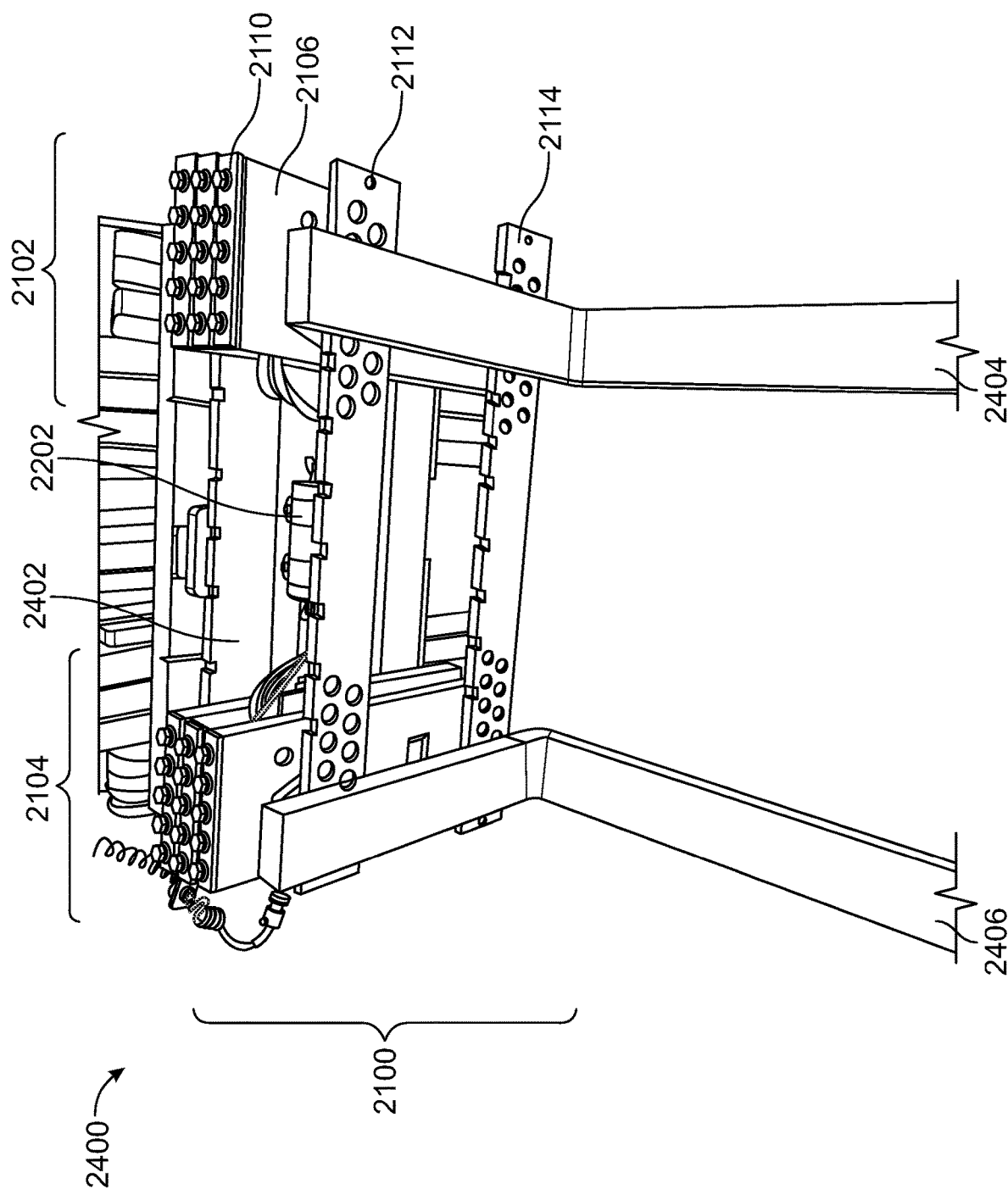
FIG. 24 is a front view image of the weighing scale of FIG. 18 mounted between a forklift carriage and forks.

FIG. 24 is a front view image of a forklift apparatus 2400 that includes weighing scale 2100 mounted between a forklift carriage 2402 and forks 2404 and 2406.

Figure 25:
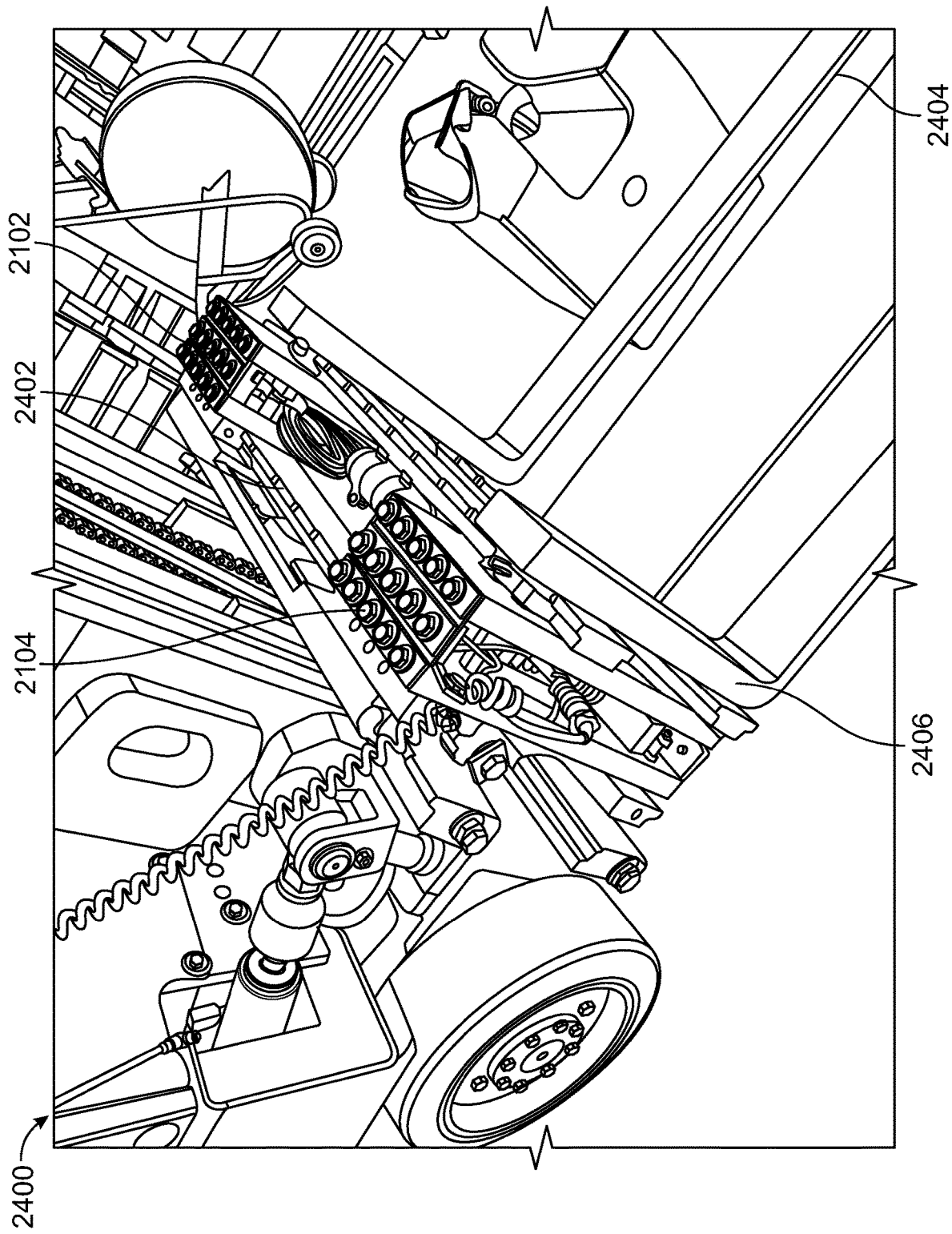
FIG. 25 is a perspective view of the forklift apparatus of FIG. 24.

FIG. 25 is a perspective view of forklift apparatus 2400.

Figure 26:
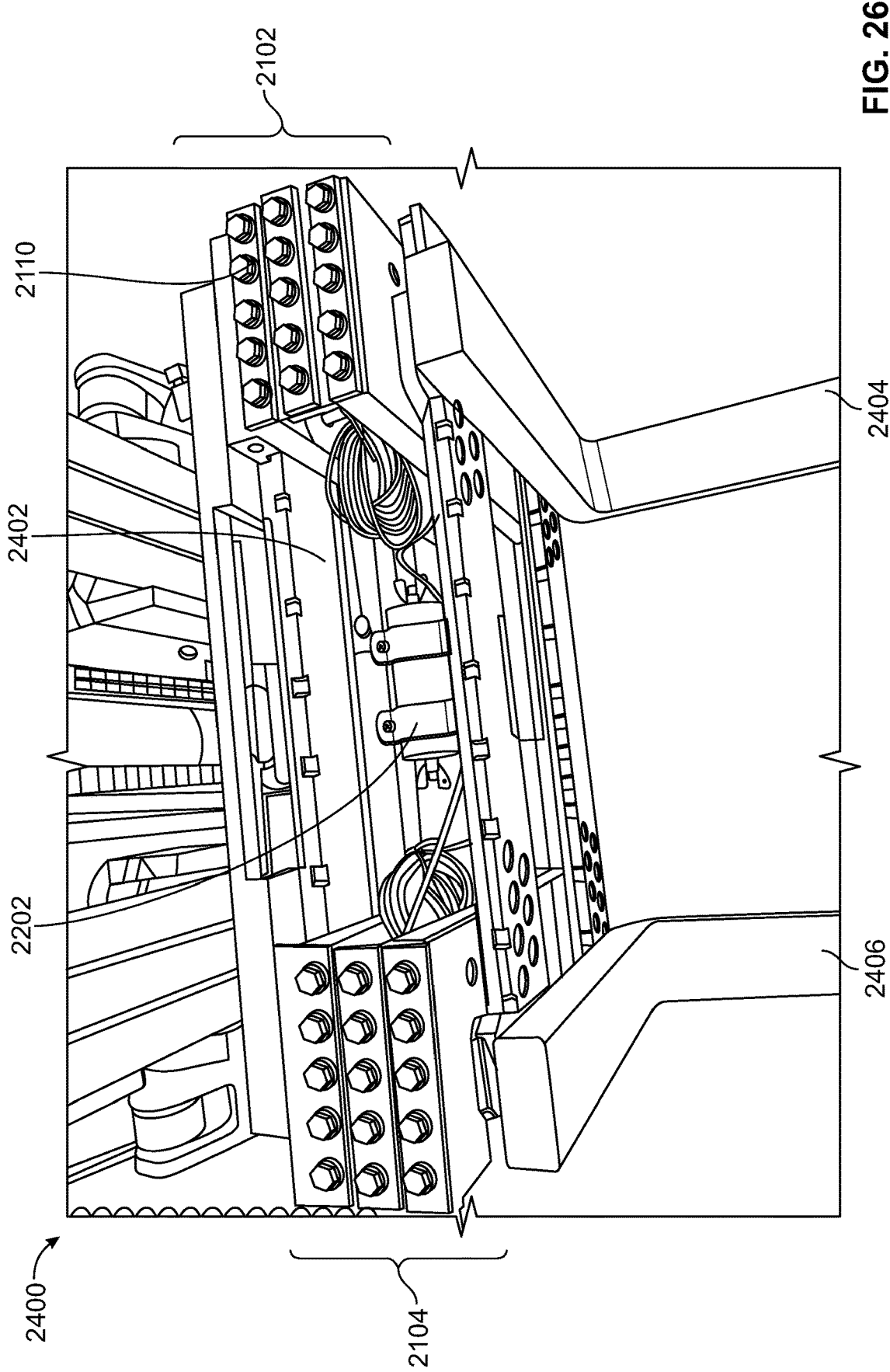
FIG. 26 is a top look-down view of the forklift apparatus of FIG. 24.

FIG. 26 is a top look-down view of forklift apparatus 2400.

Figure 27:
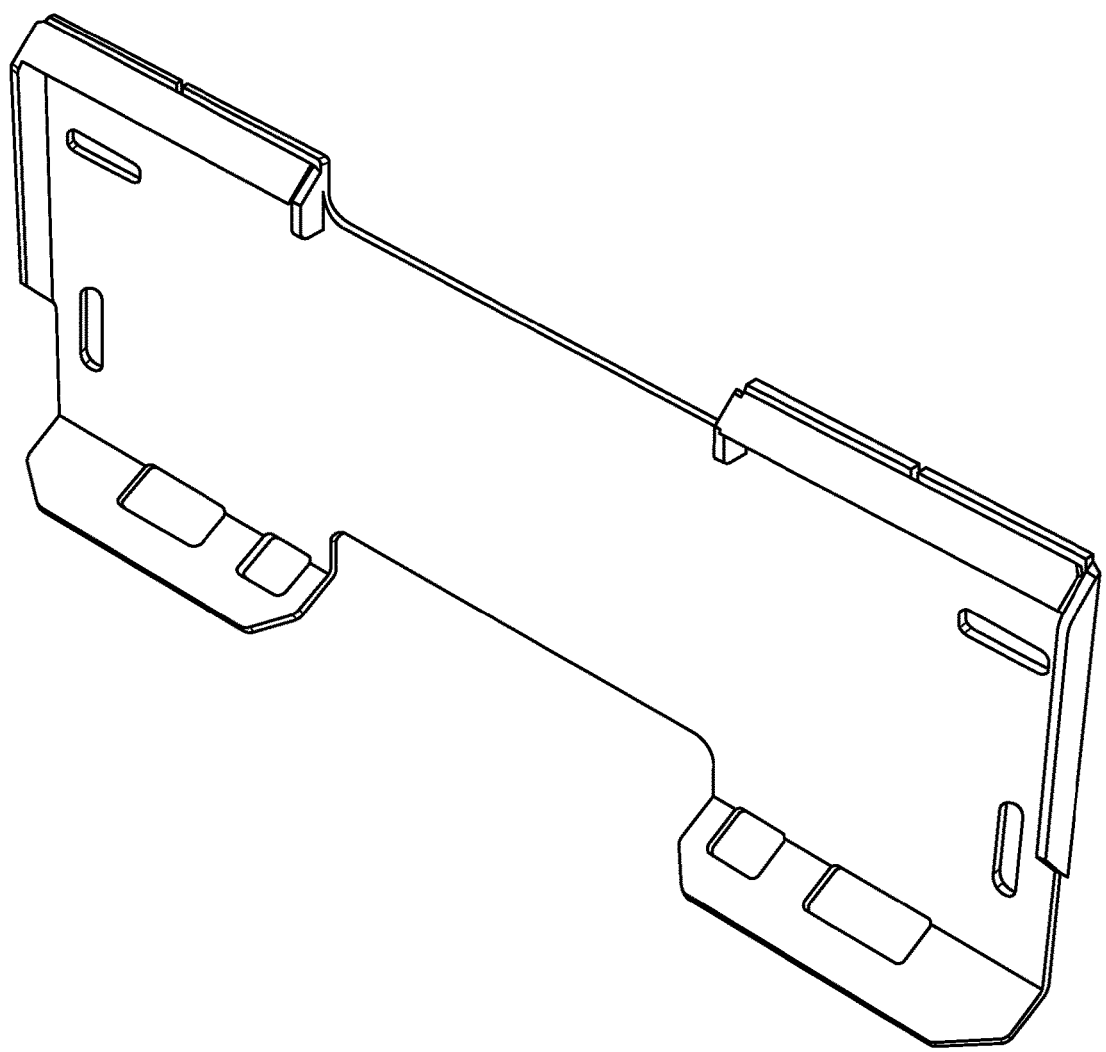
FIG. 27 is a perspective view of an example front quick attach plate.

FIG. 27 is a perspective view of a quick attach plate 2700. Quick attach plate 2700 is an example embodiment of front quick attach plate 1004 in FIG. 10.

Figure 28:
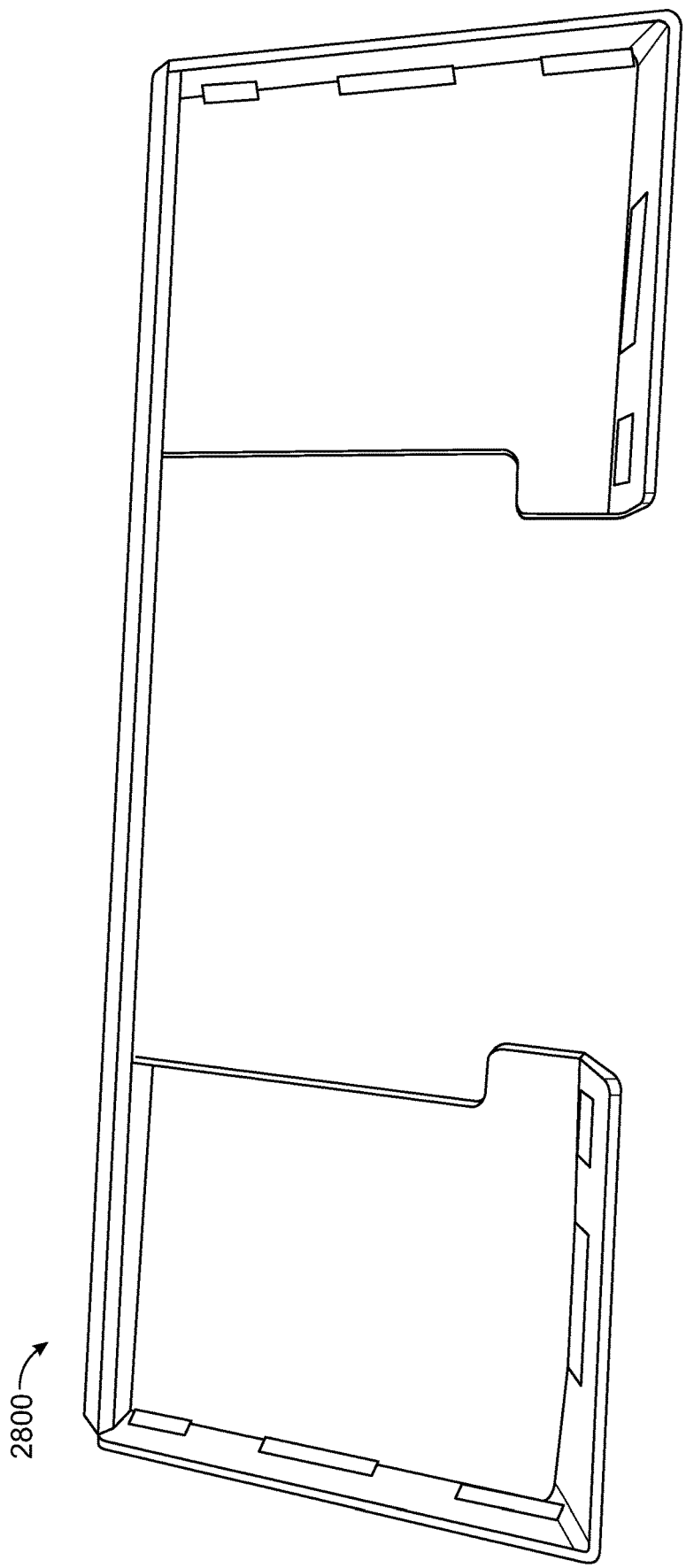
FIG. 28 is a perspective view of another example front quick attach plate.

FIG. 28 is a perspective view of a quick attach plate 2800. Quick attach plate 2800 is another example embodiment of front quick attach plate 1004 in FIG. 10.

Figure 29:
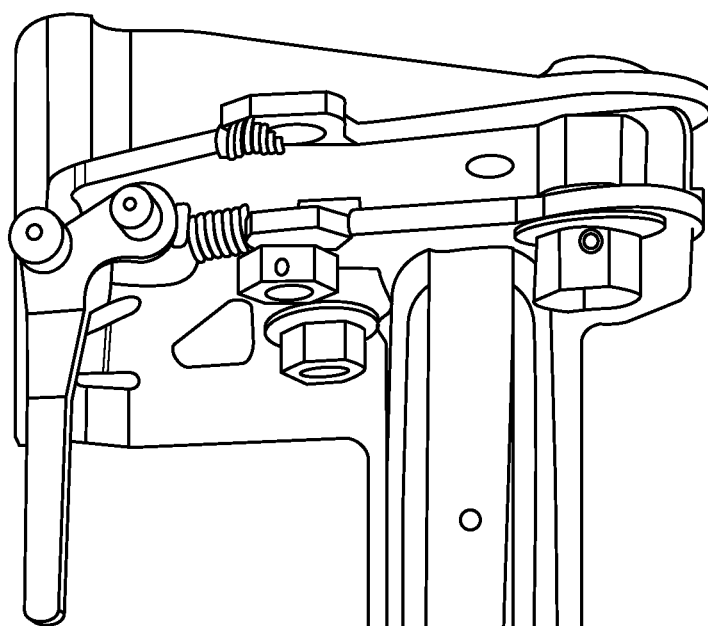
FIG. 29 is a perspective view of an example rear quick attach plate.
Figure 29:
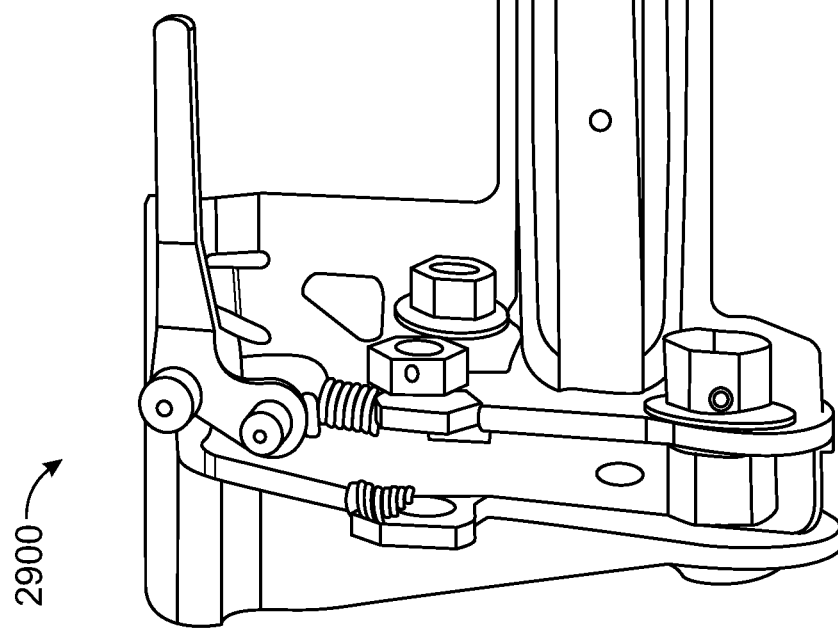

FIG. 29 is a perspective view of a quick attach plate 2900. Quick attach plate 2900 is an example embodiment of rear quick attach plate 1002 in FIG. 10. Quick attach plate 2900 is configured to couple to lifting arms of loader (i.e., front end loader or skid loader).

Figure 30:
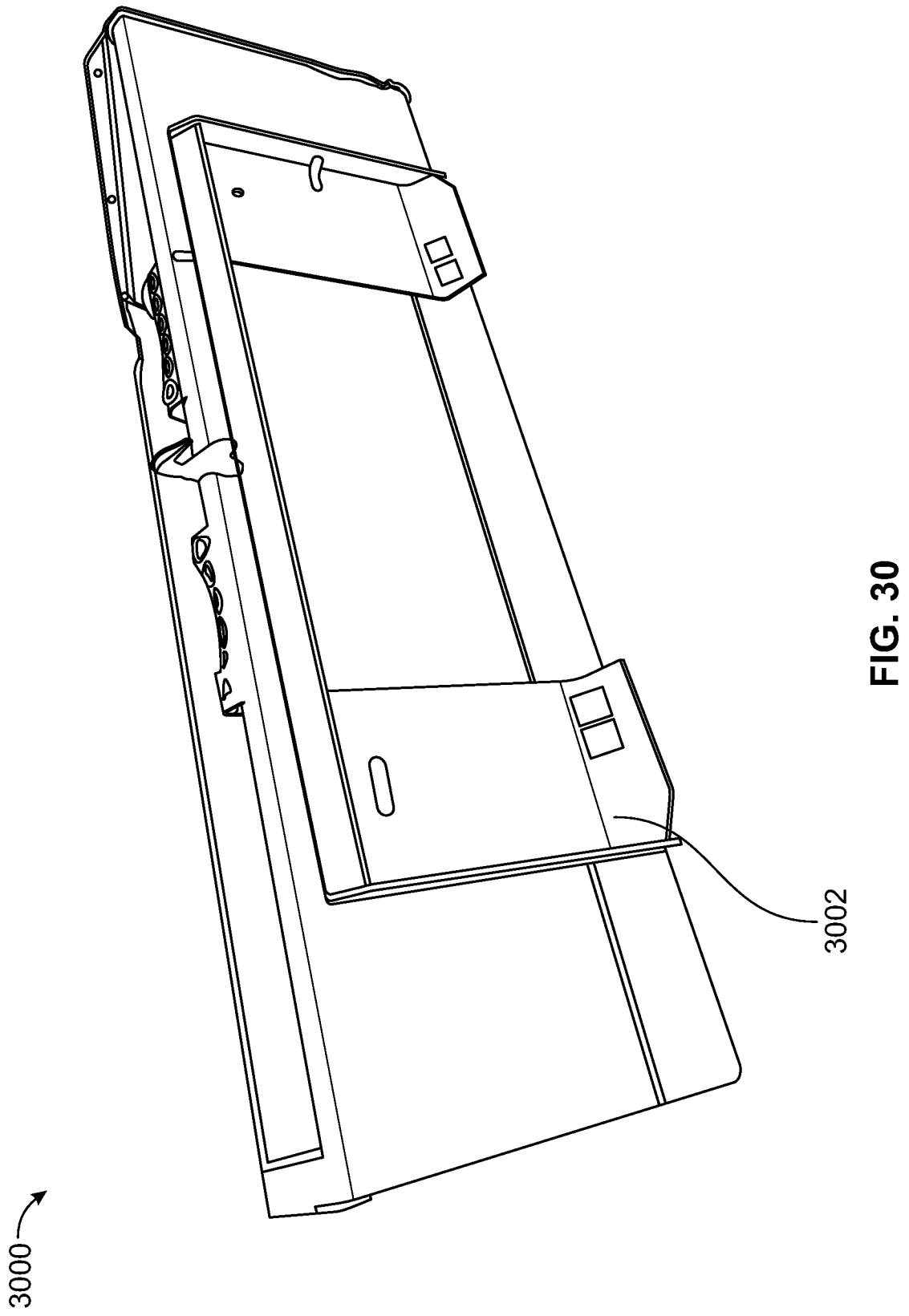
FIG. 30 is a perspective view of a lifting element that includes a front quick attach plate.

FIG. 30 is a perspective view of a lifting element 3000 that includes a quick attach plate 3002. Quick attach plate 3002 is another example embodiment of front quick attach plate 1004 in FIG. 10.

Figure 31:
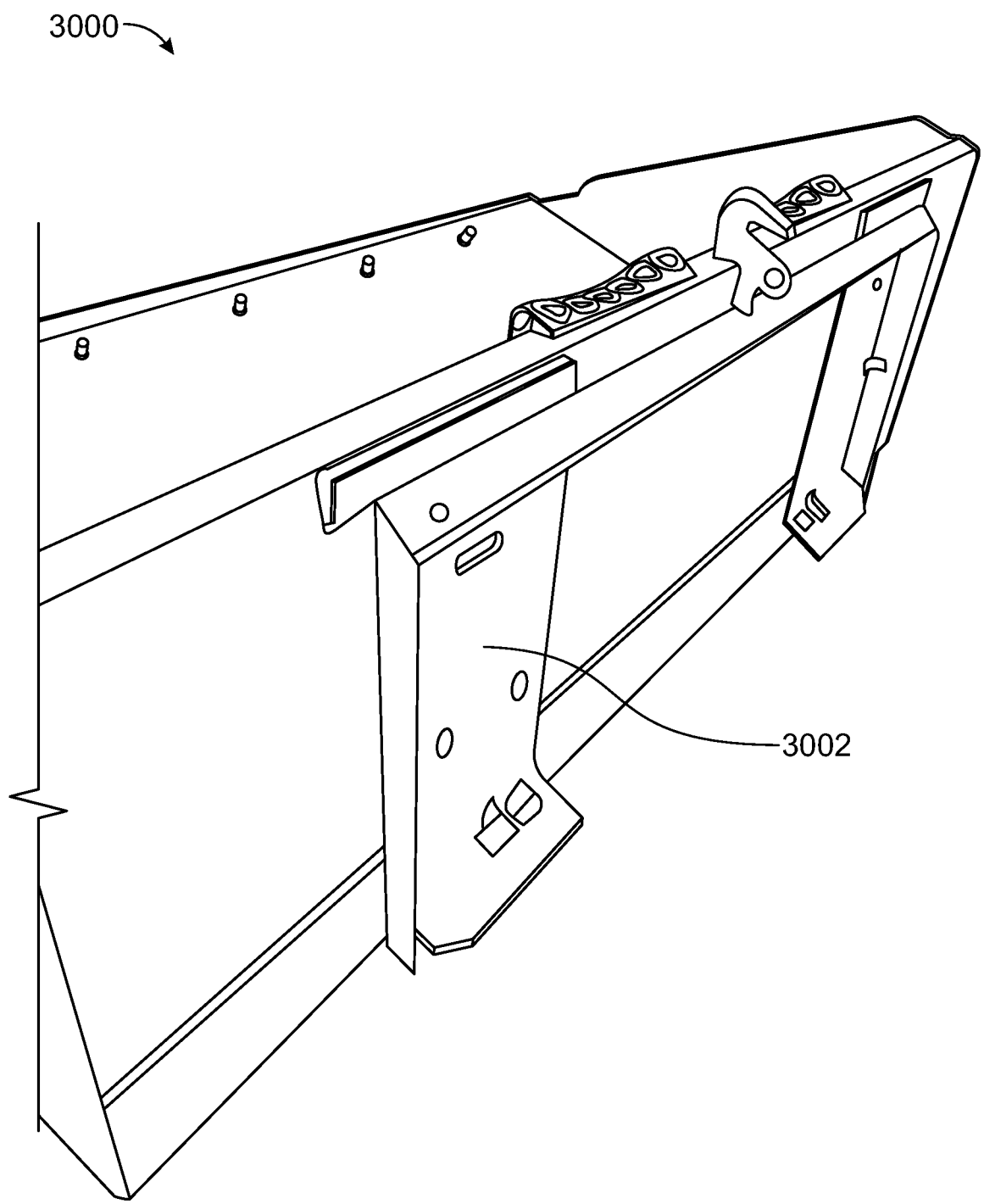
FIG. 31 is another perspective view of the lifting element of FIG. 30.

FIG. 31 is another perspective view of lifting element 3000.

Figure 32:
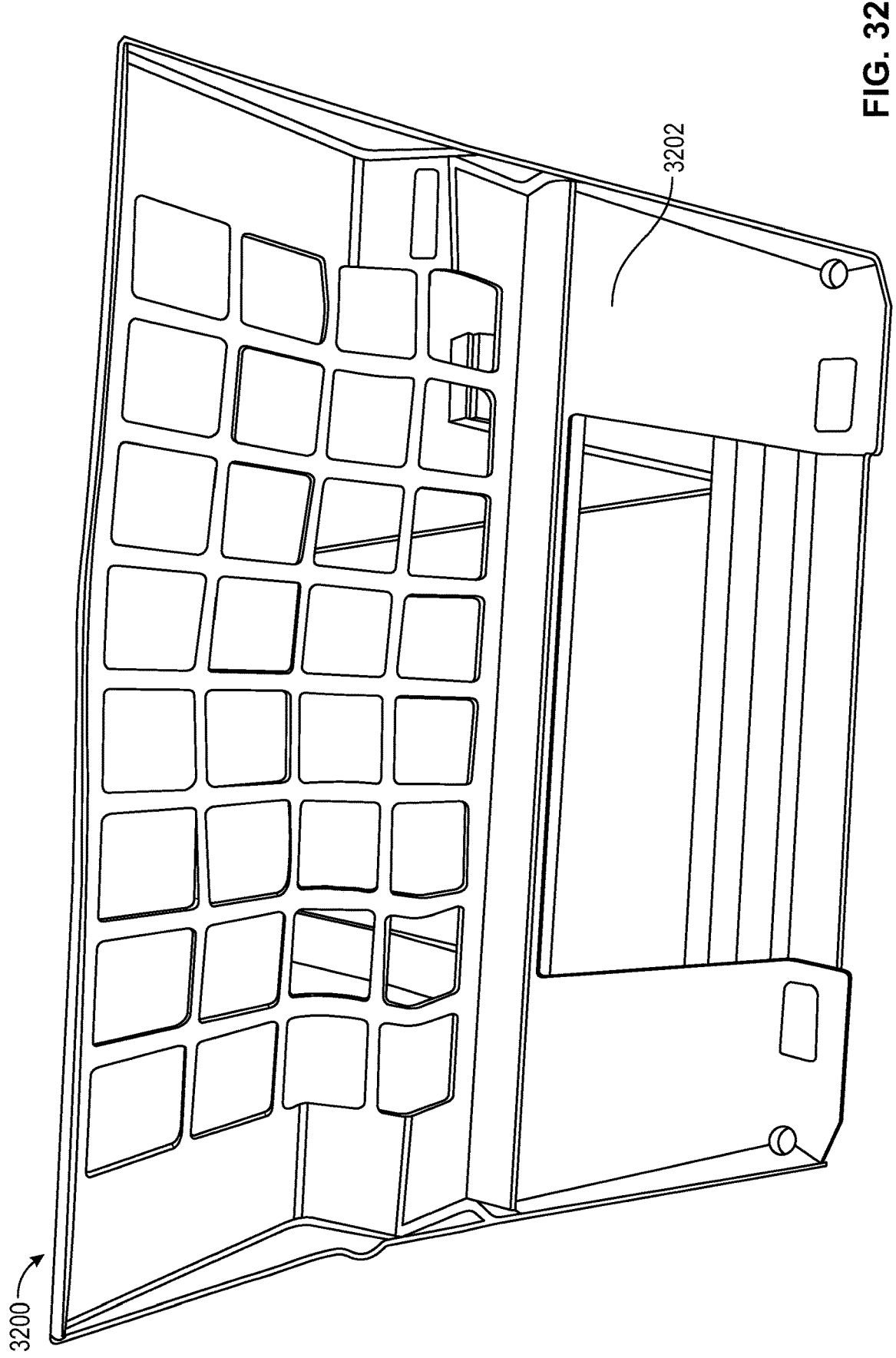
FIG. 32 is a perspective view of another lifting element that includes a front quick attach plate.

FIG. 32 is a perspective view of a lifting element 3200 that includes a quick attach plate 3202. Quick attach plate 3202 is another example embodiment of front quick attach plate 1004 in FIG. 10.

Figure 33:
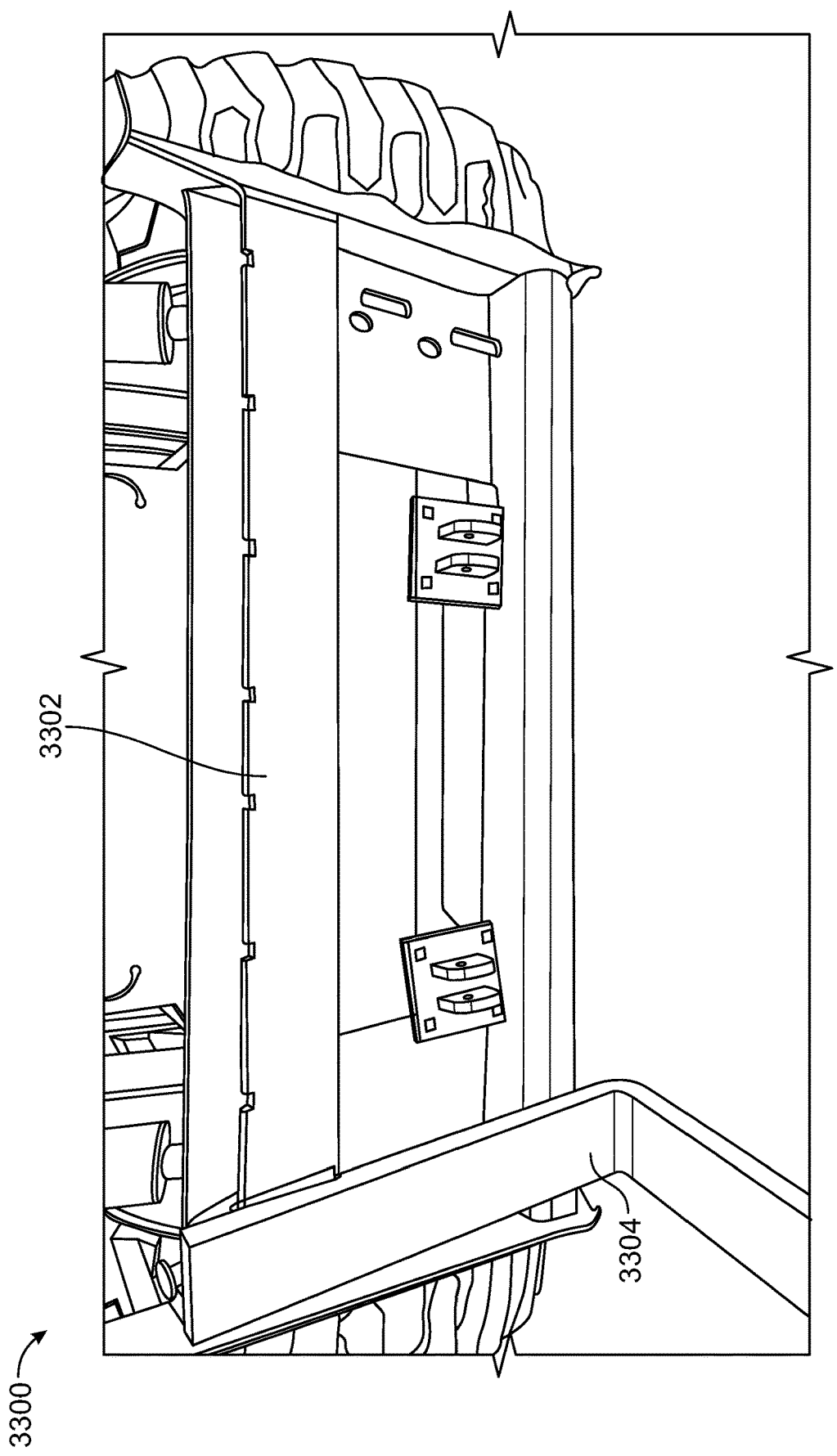
FIG. 33 is a perspective view of an example forklift that includes a crossbar and a fork.

FIG. 33 is a perspective view of a forklift 3300 that includes a crossbar 3302 and a fork 3304. Crossbar 3302 and fork 3304 are example embodiments of crossbar 902 and fork 910 in FIG. 9.

Figure 34:
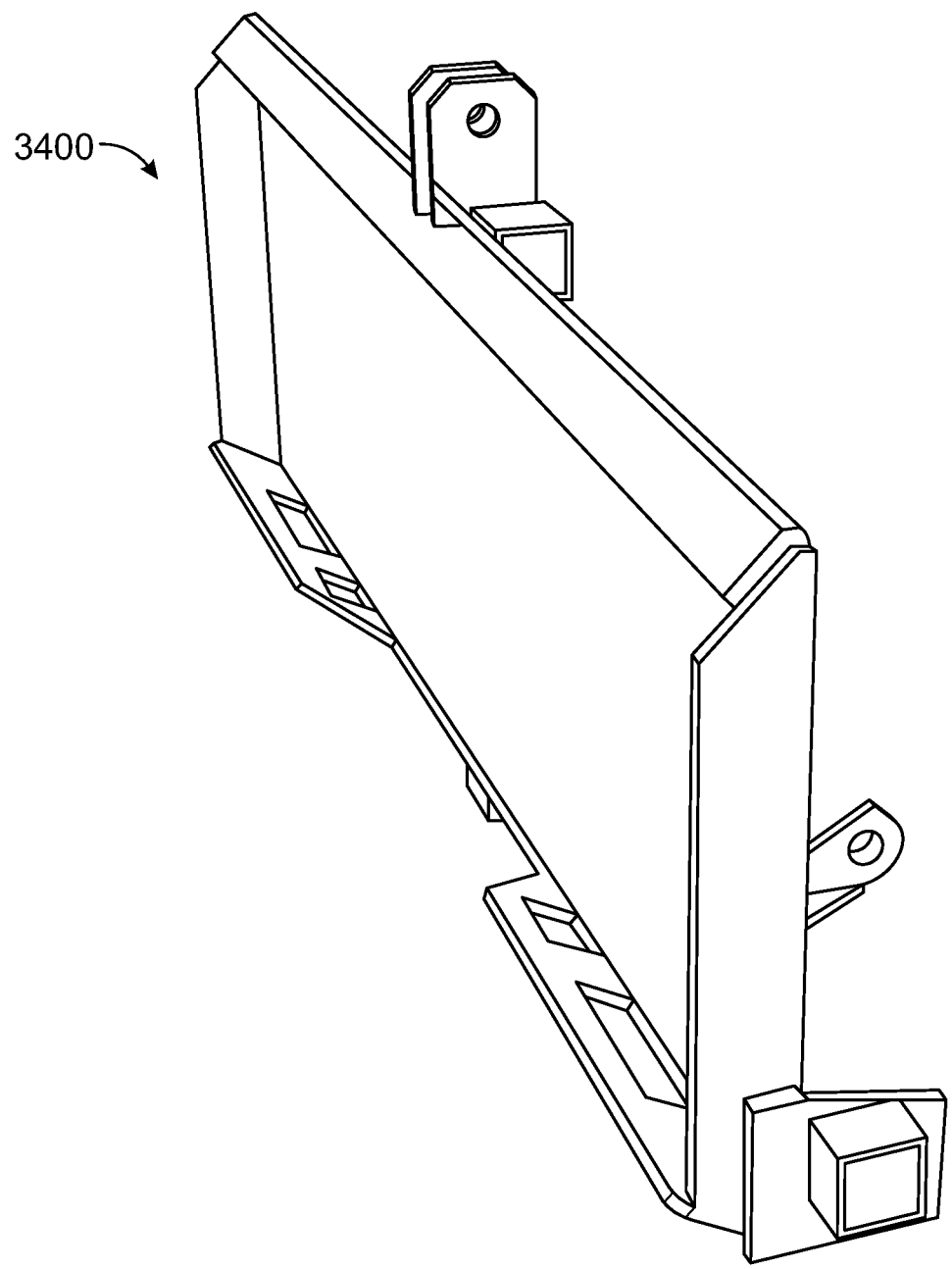
FIG. 34 is a perspective view of another example front quick attach plate.

FIG. 34 is a perspective view of a quick attach plate 3400. Quick attach plate 3400 is another example embodiment of front quick attach plate 1004 in FIG. 10. Quick attach plate 3400 is configured to support a lifting element designed for use with a 3-point hitch.

Figure 35:
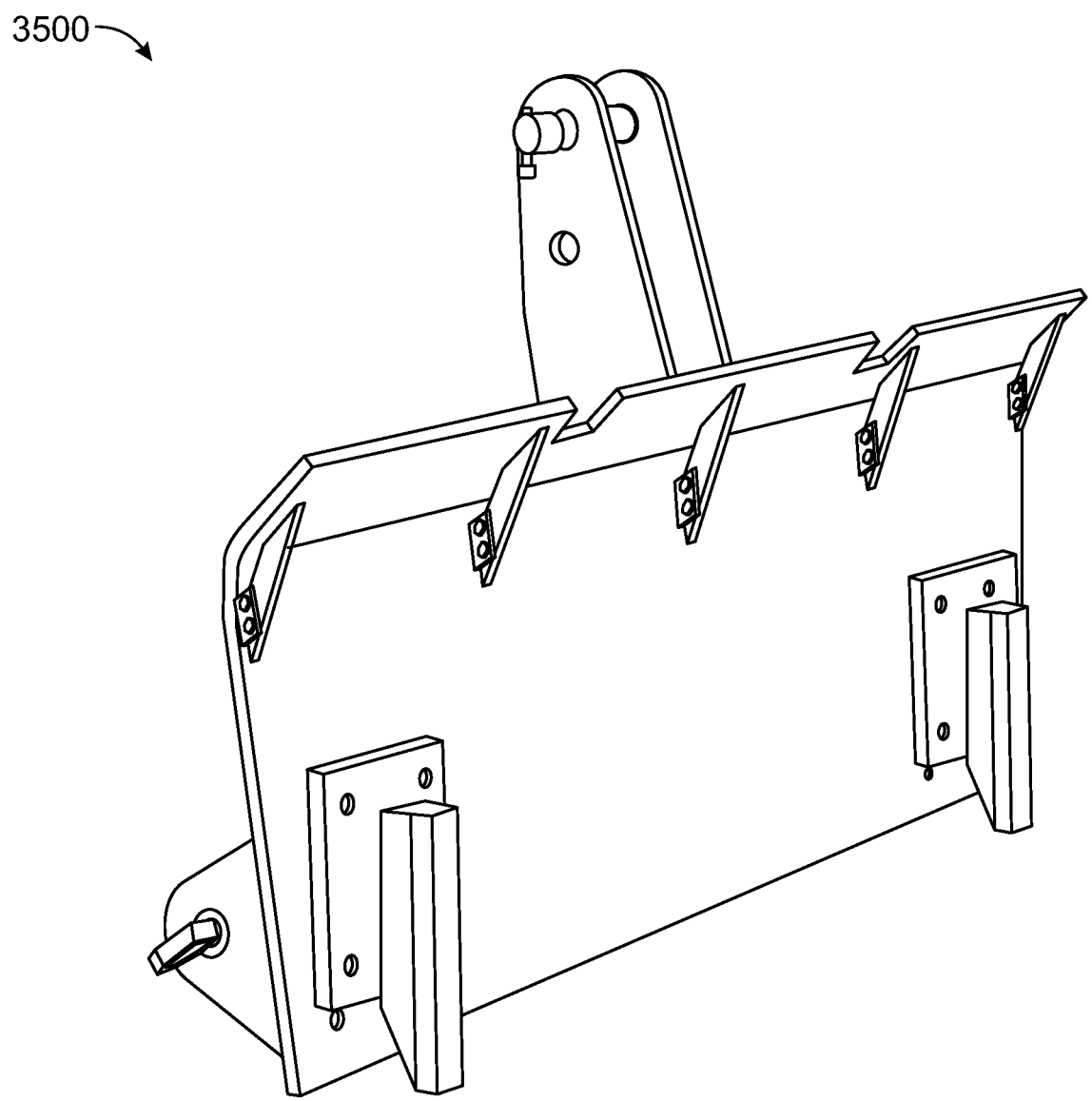
FIG. 35 is a perspective view of another example rear quick attach plate.

FIG. 35 is a perspective view of a quick attach plate 3500. Quick attach plate 3500 is another example embodiment of rear quick attach plate 1002 in FIG. 10. Quick attach plate 3500 is configured to attach to a 3-point hitch of an engine powered lifting machine, such as a tractor.

Figure 36:
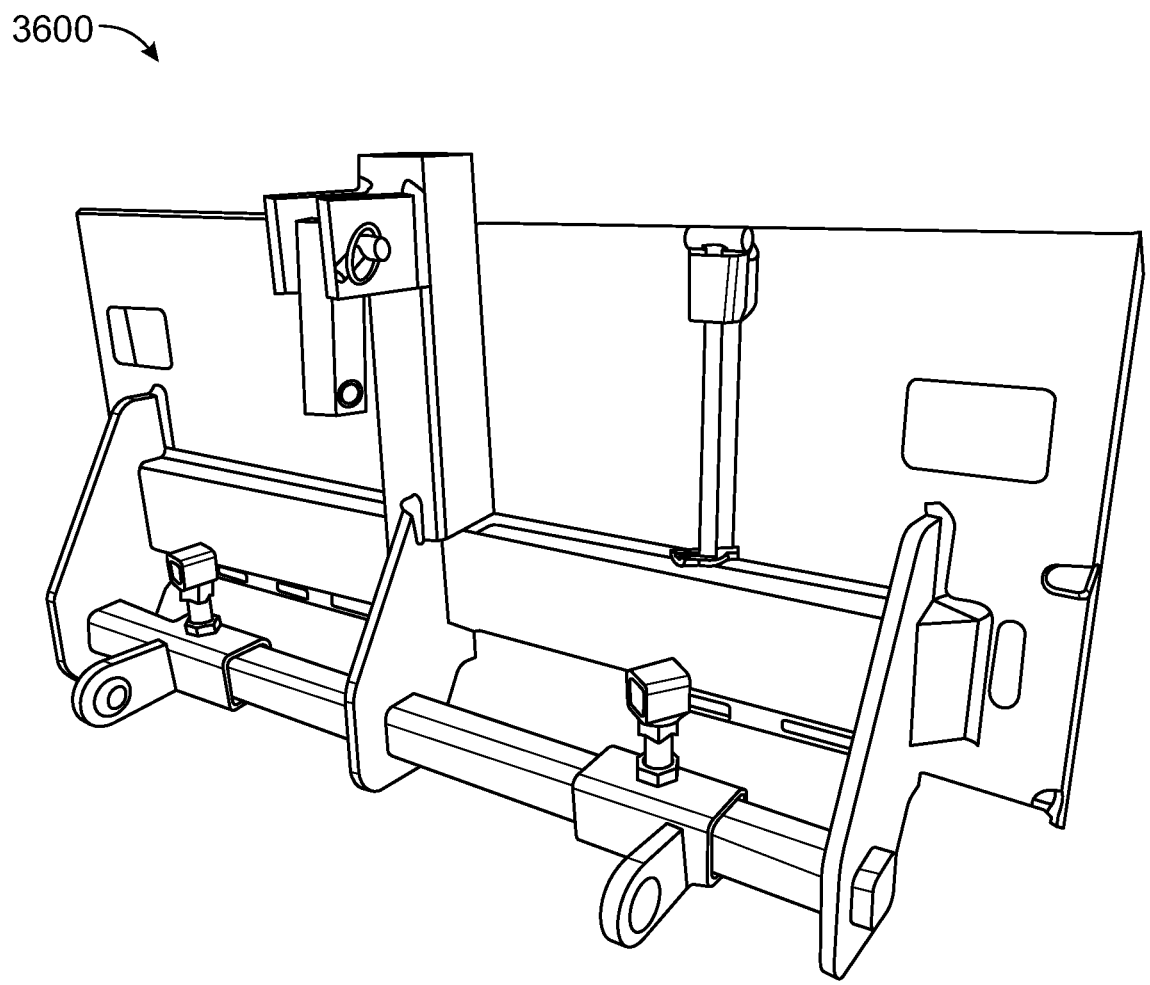
FIG. 36 is a perspective view of another example front quick attach plate.

FIG. 36 is a perspective view of a quick attach plate 3600. Quick attach plate 3600 is another example embodiment of front quick attach plate 1004 in FIG. 10. Quick attach plate 3600 is configured to attach to a 3-point hitch of an engine powered lifting machine, such as a tractor.

Figure 37:
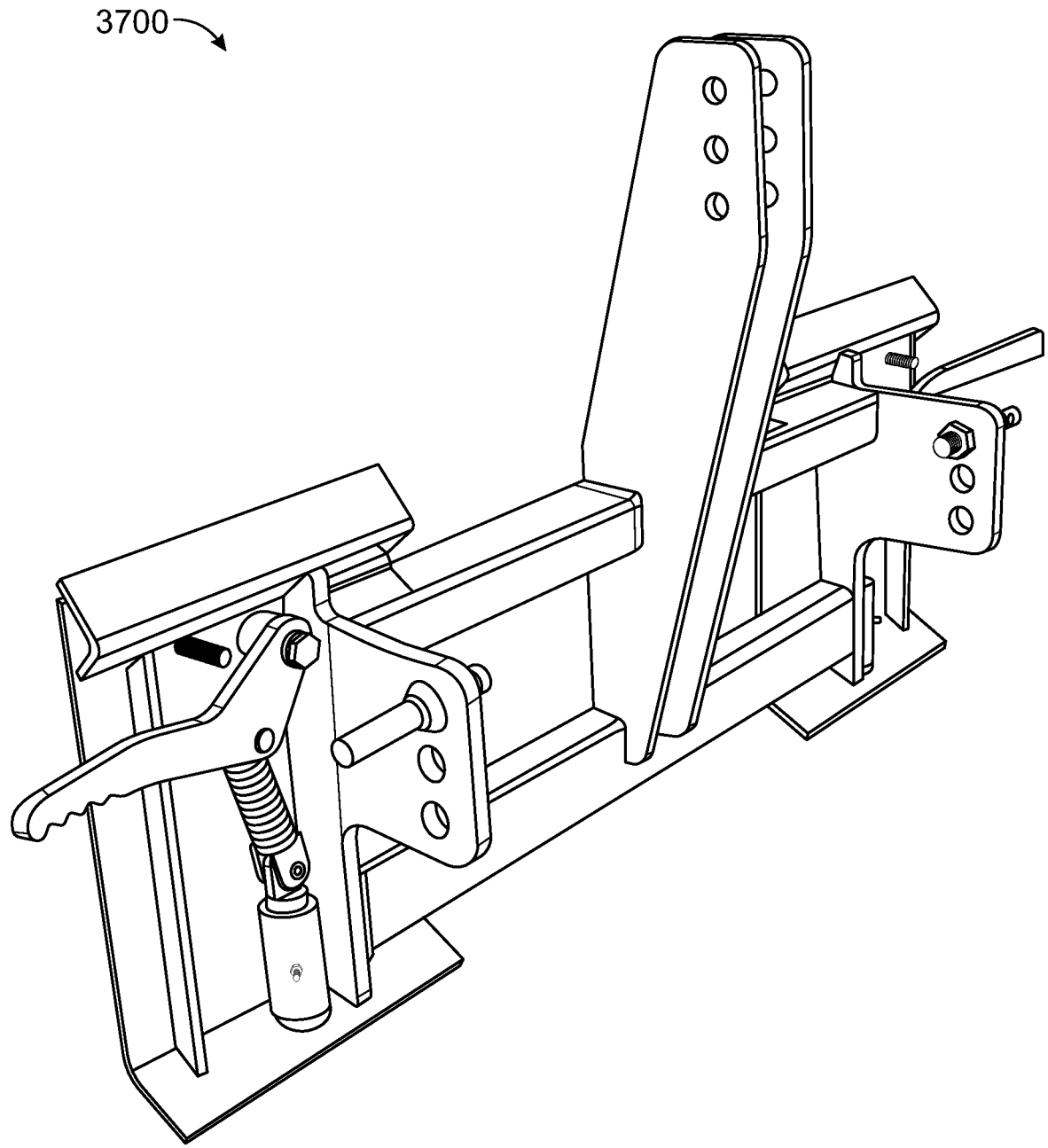
FIG. 37 is a perspective view of another example rear quick attach plate.

FIG. 37 is a perspective view of a quick attach plate 3700. Quick attach plate 3700 is another example embodiment of rear quick attach plate 1002 in FIG. 10. Quick attach plate 3700 is configured.

In an embodiment, a scale as disclosed herein may be configured to attach directly to a forklift ITA carriage, a loader with hydraulic cylinders, a tractor with a 3-point hitch, and/or a quick-attach plate, with associated mounting hardware. Similarly, a scale as disclosed herein may be configured to attach to devices to the front of the scale of the same or similar configuration with the associated mounting hardware.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. An apparatus, comprising a weighing scale that includes:
    first and second weighing members, each including a front plate, a rear plate, and a weighing element therebetween configured to output an electrical measure of weight based upon a relative deflection between the front and rear plates;
    a summing circuit to sum the electrical measures of weight of the first and second weighing members; and
    a transverse member to secure the first and second weighing members to one another at a configurable distance from one another;
    wherein a rear portion of the weighing scale is configured to couple to a lifting carriage of an engine powered lifting machine; and
    wherein a front portion of the weighing scale is configured to support a lifting element with which to lift a load to be weighed.

2. The apparatus of claim 1, wherein
    the rear portion of the weighing scale is configured to couple directly to the lifting carriage of a first engine powered lifting machine;
    the rear portion of the weighing scale is further configured to couple to a quick attach plate of a second engine powered lifting machine;
    the front portion of the weighing scale is configured to permit a lifting element of the first engine powered lifting machine to hang therefrom; and
    the front portion of the weighing scale is further configured to couple to a quick attach plate of a lifting element of the second engine powered lifting machine.

3. The apparatus of claim 1, further comprising:
    first and second braces, each configured to attach to the rear plate of a respective one of the weighing members, wherein each of the first and second braces includes an overhang portion that defines a corresponding recessed portion.

4. The apparatus of claim 3, wherein the overhang portion and the corresponding recessed portion of each of the first and second braces are configured to hang the respective weighing member from a cross bar of a lifting carriage of a fork-lift.

5. The apparatus of claim 3, wherein the overhang portion and the recessed portion of each of the first and second braces are configured to receive and secure an upper portion of a quick attach plate of the engine powered lifting machine.

6. The apparatus of claim 3, wherein:
    the overhang portion and the recessed portion of each of the first and second braces are configured to hang the respective weighing member from a cross bar of a lifting carriage of a fork-lift engine powered lifting machine; and
    the overhang portion and the recessed portion of each of the first and second braces are further configured to receive and secure an upper portion of a rear quick attach plate of another engine powered lifting machine.

7. The apparatus of claim 1, wherein:
the transverse member comprises first and second transverse members, each configured to releasably attach to and extend horizontally between the front plate of the first weighing member and the front plate of the second weighing member; and
each of the first and second transverse members includes a protrusion that defines a recessed portion; and
the protrusion and recessed portions are configured to support the lifting element.

8. The apparatus of claim 7, wherein the first and second transverse members are identical to and interchangeable with one another.

9. The apparatus of claim 7, wherein:
the protrusion and recessed portions are configured to support forks of a forklift.

10. The apparatus of claim 7, wherein:
the protrusion and recessed portions are configured to permit a quick attach plate of the lifting element to hang therefrom.

11. The apparatus of claim 7, wherein:
the protrusion and recessed portions are configured to support forks of a forklift; and
the protrusion and recessed portions are further configured to permit a quick attach plate of a lifting element of another engine powered lifting machine to hang therefrom.

12. The apparatus of claim 1, wherein the weighing scale is configured to couple to each of multiple engine powered lifting machines.

13. The apparatus of claim 1, wherein the weighing scale is configured to couple to two or more of the following types of engine powered lifting machines:
a forklift;
a front-end loader
a skid loader; and
a three-point hitch.

14. An apparatus, comprising, a first weighing element that includes:
a front plate;
a rear plate;
an upper flexible plate coupled between upper ends of the front and rear plates and a lower flexible plate coupled between lower ends of the front and rear plates to maintain the front and rear plates parallel with one another; and
a weighing assembly coupled between the front plate and the rear plate, wherein the weighing assembly comprises,
a strain gauge-based load cell to output an indication of force applied to the weighing assembly,
a first rod extending from a first end of the load cell to attach the weighing assembly to the rear plate,
a second rod extending from a second end of the load cell to attach the weighing assembly the front plate, and
a mechanical preload adjustment to adjust a length of the weighing assembly to control a vertical difference between front and rear plates.

15. The apparatus of claim 14, wherein the weighing assembly further comprises:
a mechanical linearity control to adjust an angle of the weighing assembly relative to the front and rear plates.

16. The apparatus of claim 14, wherein the weighing assembly further comprises:
a carriage alignment knob that is extendable from an outer surface of the rear plate to compensate for uneven surface of a lifting carriage of an engine powered lifting machine.

17. The apparatus of claim 14, wherein the weighing assembly further comprises:
a shock absorber in-line with the first rod or the second rod.

18. The apparatus of claim 14, wherein the first weighing element is configurable to receive a shim between the rear plate and the lower flexible plate and/or between the front plate and the upper flexible plate to compensate for a distance between the front plate and a load.

19. The apparatus of claim 14, further comprising:
a second weighing element similar to the first weighing element; and
a transverse member to secure the first and second weighing members to one another at a configurable distance from one another; and
a summing circuit to sum the outputs of the first and second weighing members.

20. The apparatus of claim 19, wherein:
the rear plates of the first and second weighing members are configured to couple to a lifting carriage of an engine powered lifting machine; and
the front plates of the first and second weighing members are configured to support a lifting element with which to lift a load to be weighed.

21. The apparatus of claim 14, wherein the first weighing element further includes a safety device to retain the front and rear plates proximate to one another in the event of a failure the upper flexible plate and/or the lower flexible plate.

* * * * *